US012747387B2

(12) United States Patent
Pei

(10) Patent No.: US 12,747,387 B2
(45) Date of Patent: Sep. 29, 2026

(54) PHASE-CHANGING POLYMER FILM FOR THERMOCHROMIC SMART WINDOWS APPLICATIONS

(71) Applicant: The Regents of the University of California, Oakland, CA (US)

(72) Inventor: Qibing Pei, Calabasas, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 867 days.

(21) Appl. No.: 18/015,477

(22) PCT Filed: Jul. 12, 2021

(86) PCT No.: PCT/US2021/041275
§ 371 (c)(1),
(2) Date: Jan. 10, 2023

(87) PCT Pub. No.: WO2022/011340
PCT Pub. Date: Jan. 13, 2022

(65) Prior Publication Data
US 2023/0287258 A1 Sep. 14, 2023

Related U.S. Application Data

(60) Provisional application No. 63/050,602, filed on Jul. 10, 2020.

(51) Int. Cl.
*C09K 9/02* (2006.01)

(52) U.S. Cl.
CPC ............ *C09K 9/02* (2013.01); *C09K 2211/14* (2013.01)

(58) Field of Classification Search
CPC .............................. C09K 9/02; C09K 2211/14
See application file for complete search history.

(56) References Cited

U.S. PATENT DOCUMENTS 5,585,425 A 12/1996 Kito et al.
12,529,917 B2 * 1/2026 Pei ........................ G02F 1/0147
(Continued)

FOREIGN PATENT DOCUMENTS

TW 1656164 B 4/2019

OTHER PUBLICATIONS

PCT International Search Report dated Oct. 20, 2021 for PCT Application No. PCT/US2021/041275.
(Continued)

*Primary Examiner* — Shane Fang
(74) *Attorney, Agent, or Firm* — GATES & COOPER LLP

(57) ABSTRACT

A solid state thermochromic polymer film comprising two or more separated solid phases with matched refractive indices, wherein the separated solid phases are transparent; and one of the phases undergoes a crystal melting above a threshold temperature resulting in significant reduction of its refractive index. The one of the phases undergoing the crystal melting becomes opaque when its temperature rises above said threshold temperature; and reverts to being transparent when its temperature lowers to an ambient temperature below said threshold temperature. In one example, the new thermochromic phase-changing copolymer with switchable optical transparency is fabricated via copolymerizing hydrophilic poly(hydroxyethyl acrylate) and hydrophobic poly(hexadecyl acrylate-tetradecyl acrylate). The polymer film is transparent due to matched refractive indices of the phase separated domains, but turns opaque when the long alkyl chains undergoes crystalline melting above 28-32° C. The transmittance modulation is autonomous and reversible.

20 Claims, 28 Drawing Sheets

(56) References Cited

U.S. PATENT DOCUMENTS

| | | | |
|---|---|---|---|
| 2009/0167971 | A1 | 7/2009 | Powers et al. |
| 2010/0247900 | A1 | 9/2010 | Parker et al. |

OTHER PUBLICATIONS

Xie et al. “A Phase-Changing Polymer Film for Broadband Smart Window Applications.” Macromolecular Rapid Communications [online], Jul. 21, 2020 (Jul. 21, 2020) [Retrieved on Sep. 10, 2021], vol. 41, Issue 16.

* cited by examiner a a b

C

PHASE-CHANGING POLYMER FILM FOR THERMOCHROMIC SMART WINDOWS APPLICATIONS

CROSS REFERENCE TO RELATED APPLICATIONS

This application claims the benefit under 35 U.S.C. Section 119 (e) and commonly-assigned U.S. provisional patent application Ser. No. 63/050,602, filed on Jul. 10, 2020, by Qibing Pei "A PHASE-CHANGING POLYMER FILM FOR THERMOCHROMIC SMART WINDOWS APPLICATIONS," which application is incorporated by reference herein.

BACKGROUND OF THE INVENTION

1. Field of the Invention

The present invention relates to phase changing polymers and methods of making the same.

2. Description of the Related Art (Note: This application references a number of different publications as indicated throughout the specification. Each of these publications is incorporated by reference herein.)

The global issues of climate change and the rapidly escalating energy consumption have inspired developments for improved efficiency of energy usage. Stimuli-responsive materials can change their optical properties when exposed to external stimuli such as temperature,[1, 2] pressure,[3] light,[4] magnetic fields or electric field[6] or when exposed to chemicals.[7] In recent years, smart responsive materials have yielded impressive progress in smart windows,[8] sensors,[9] and other on-demand devices.[10] Smart windows have tunable opacity to regulate solar-irradiation into buildings and residences, and thus can reduce the overall demand for air conditioning and heating. Thermochromic materials exhibit different colors or optical transmittance triggered by temperature changes, which could occur automatically through seasonal weather changes. Such autonomous modulation simplifies the structure and installation. The nonuse of electrical energy inputs makes it easy to achieve net energy savings.[11]

Several kinds of thermochromic materials have been extensively studied, including vanadium dioxide ($VO_2$),[12-16] ionic liquids,[17] perovskites,[18] liquid crystals[19-21] and hydrogels.[22-24] The reversible metal-insulator phase transition of $VO_2$ at the critical temperature ($T_c$) of 68° C. leads to a sharp change in the near-infrared spectrum. However, the high $T_c$ and relatively low visible light transmittance limit the development of $VO_2$ based smart devices. Both ionic liquids and perovskites have been investigated for photochromic switching based on their crystalline phase transition, but their switchable bandwidth in the solar flux range is narrow. Polymer-dispersed liquid crystals (PDLCs) can switch transmittance with a reversible transition of liquid crystal orientation via thermal or electric stimulation.[25] The complexity of the system leads to high cost and low durability. Hydrogel have attracted a lot of interests in recent years thanks to the impressive transparency at ambient temperature and high opacity above its lower critical solution temperature.[22, 26] However, critical issues such as hydrostatic pressure, syneresis over time, and water leakage are not easy to resolve for hydrogel based systems. Therefore, there is a need to explore new solid-state thermochromic materials that have a transition temperature which can be naturally obtained for autonomous modulation, and the modulated spectrum is broadband in the solar flux range.

Phase-changing polymer (PCP) shows reversible phase transition between amorphous and semicrystalline state. Specifically, when the temperature is below the melting temperature ($T_m$) of a PCP, the PCP is at semicrystalline state. Once the temperature is above the $T_m$ of PCP, namely crystals melt, PCP will absorb heat and be amorphous. PCP and its copolymers have been investigated in drug release,[27] actuator,[28] and thermal energy storage.[29] We recently introduced a thermochromic solid-state phase-changing polymer film for smart windows.[30] This system has the benefits of promising transmittance modulation and cycle stability, however, the regulation law is contrary to the common regulation of smart window as it is opaque at room temperature and transparent at elevated temperatures. In addition, the transition temperature was 46° C.; a Joule heater is required to control the transition, while the ideal thermochromic material should be triggered at 28-32° C. Therefore, new PCPs are therefore desired which are transparent at room temperature allowing sunlight to pass through, and turn opaque at high temperature to block solar radiation. The present invention satisfies this need.

SUMMARY OF THE INVENTION

The present disclosure describes a composition of matter useful as a thermochromic film in a smart window. The film can be embodied in many ways including, but not limited to, the following.

1. A solid state thermochromic polymer film comprising: two or more separated solid phases, wherein:
   - the separated solid phases are transparent and comprise at least one phase which:
     - undergoes a crystal melting and has a reduced refractive index above a threshold temperature;
     - becomes opaque when its temperature rises above said threshold temperature; and
     - reverts to being transparent when its temperature lowers to an ambient temperature below said threshold temperature.

2. The solid state thermochromic polymer film of example 1, wherein the film:
   - is transparent at the ambient temperature with a transmittance greater than 70% (e.g., 70%≤Transmittance≤100%) for one or more wavelengths λ or all the wavelengths λ wherein 400 nanometers≤λ≤1400 nanometers;
   - becomes opaque at a temperature above the threshold temperature with the transmittance less than 50% (e.g., 0%≤Transmittance≤50%) for the one or more wavelengths λ or all the wavelengths λ wherein 400 nanometers≤λ≤1400 nanometers; and
   - has the threshold temperature comprising an opacity transition temperature that is greater than 28° C. and less than 130° C.

3. The solid state thermochromic polymer film of example 2, wherein the opacity transition temperature is greater than 28° C. and less than 50° C.

4. The solid state thermochromic polymer film of any of the examples 1-3, wherein:
   - the crystal melting induces a refractive index reduction by at least 0.01, and
   - the refractive index reduction is reversed when the temperature of the solid state thermochromic polymer film is lowered to the ambient temperature.

5. The solid state thermochromic polymer film of any of the examples 1-4, wherein:

the refractive index reduction is greater than 0.01 over a temperature range of +/−3° C. with respect to the threshold temperature.

6. The solid state thermochromic polymer film of any of the examples 1-5, wherein the at least one phase undergoing the crystal melting comprises:

polymer chain segments comprising at least one of a polyacrylate, a polymethacrylate, a polycarbonate, a polyamide, a polyurethane, a polysiloxane, a poly (olefin oxide), poly(olefin glycol), or a copolymer thereof; and one or more side chains attached to the polymer chain segments, the side chains comprising at least one of a dodecyl, a tetradecyl, a hexadecyl, or an octadecyl.

7. The solid state thermochromic polymer film of example 6, wherein the polymer chain segments comprise at least one of an ethoxylated acrylate, an ethoxylated trimethylolpropane triacrylate, a poly(ethylene glycol) diacrylate, an ethoxylated methacrylate, an ethoxylated trimethylolpropane trimethacrylate, a poly(ethylene glycol) dimethacrylate, a propoxylated acrylate, a propoxylated diacrylate, a propoxylated trimethylolpropane triacrylate, a propoxylated methacrylate, a propoxylated dimethacrylate, or a propoxylated trimethylolpropane trimethacrylate.

8. The solid state thermochromic polymer film of any of the examples 1-7, wherein at least one of the separated solid phases does not undergo a phase change around the threshold temperature.

9. The solid state thermochromic polymer film of example 8, wherein the at least one of the separated solid phases which does not undergo the phase change around the threshold temperature comprises one or more first compounds comprising at least one of a hydroxyl, a cyano, a carboxylic acid, an amine, an alkylamine, an amide, a ketone, or an ether.

10. The solid state thermochromic polymer film of claim 1 prepared by copolymerization of a mixture comprising at least hexadecyl acrylate and 2-hydroxyethyl acrylate.

11. The solid state thermochromic polymer film of any of the examples 1-9 prepared by copolymerization of a mixture comprising at least hexadecyl methacrylate and 2-hydroxyethyl methacrylate.

12. The solid state thermochromic polymer film of example 10, example 11, or example 10 and example 11, wherein the mixture further comprises one or more multifunctional monomers comprising at least one of a diacrylate, a dimethacrylate, a triacrylate, a trimethacrylate, an oligoacrylate, or a oligomethacrylate.

13. The solid state thermochromic polymer film of any of the examples 10-12, wherein the copolymerization is by a means of ultraviolet (UV) exposure or heating.

14. The solid state thermochromic polymer film of any of the examples 1-13, comprising a first polymer interspersed with a second polymer; wherein:

the first polymer is a majority component of the at least one phase undergoing the crystal melting;

the second polymer is a majority component of each of the one or more phases not undergoing the phase transition around the threshold temperature;

the first polymer and the second polymer have matched refractive indices before the phase change of the first polymer resulting in the crystal melting; and the first polymer phase changes from a crystalline state to an amorphous state upon heating from a temperature below a melting point of the first polymer to a temperature above the melting point.

15. The solid state thermochromic polymer film of example 14 wherein the first polymer comprises one or more hydrocarbon groups comprising at least one of a dodecyl, a tetradecyl, a hexadecyl, or an octadecyl.

16. The solid state thermochromic polymer film of example 14 or 15 wherein the second polymer comprises one or more polar groups comprising at least one of a hydroxyl, a cyano, a carboxylic acid, an amine, an alkylamine, an amide, a ketone, or an ether.

17. The solid state thermochromic polymer film of any of the examples 14-16 wherein the first polymer is blended with the second polymer.

18. The solid state thermochromic polymer film of any of the examples 14-17 wherein the solid state thermochromic polymer film is prepared by partially reacting said first polymer with the second polymer.

19. The solid state thermochromic polymer film of any of the examples 1-18, wherein at least two of the separated solid phases comprise phase grains having a largest dimension larger than 1 micrometer.

20. The solid state thermochromic polymer film of any of the examples 1-19, wherein the two separated solid phases:

a) have matching refractive indices within 0.5% of each other below the threshold temperature; and b) have refractive indices more than 0.6% different from each other above the threshold temperature.

21. The solid state thermochromic polymer film of any of the examples 1-20, having the transmittance of at least 70% (e.g., 70%≤Transmittance≤100%) below the threshold temperature due to the matching refractive indices of the two different phases and a lower transmittance of no more than 50% (e.g., 0%≤Transmittance≤50%) above the threshold temperature due to the mismatching refractive indices of the two different phases.

22. The solid state thermochromic polymer film of example 21, wherein a thickness T of the solid state thermochromic polymer film is 1 micrometer≤T≤1 millimeter.

23. The solid state thermochromic polymer film of example 22, wherein the thickness Tis 10 micrometers≤T≤500 micrometers.

24. A smart window comprising:

the solid state thermochromic polymer film of any of the examples 1-23; and a transparent heater comprising a transparent conductive layer in thermal contact with the solid state thermochromic polymer film so as to heat the solid state thermochromic polymer film when desired, wherein the transparent conductive layer has a transmittance of at least 70% (e.g., 70%≤Transmittance≤100%) for one or more wavelengths λ or all the wavelengths λ wherein 400 nanometers≤λ≤1400 nanometers.

25. The smart window of example 24, wherein the transparent conductive layer comprises a transparent conductive material including at least one of a metal coating, metal nanowires, a metal grid, carbon nanotubes, graphene, or indium tin oxide.

26. The smart window of any of the example 24 and/or example 25, wherein the smart window:

a) comprises a sheet or is conformal with a flat or curved surface, b) is transparent at the ambient temperature, as characterized by having a transmittance of at least 70% (e.g., 70%≤Transmittance≤100%) for one or more wavelengths λ or all the wavelengths λ wherein 400 nanometers≤λ≤1400 nanometers, c) is electrically controlled to become opaque with the transmittance less than 50% (e.g., 0%≤Transmittance≤50%) for the one or more wavelengths λ or all the wavelengths λ wherein 400 nanometers≤λ≤1400 nanometers, when the solid state thermochromic polymer film heated above the threshold temperature using the transparent heater, d) has an opacity maintained with continuous heating by the transparent heater, and e) has the opacity reduced when the transparent heater is switched off.

27. The smart window or solid state thermochromic polymer film of any of the examples 1-26 wherein:

the at least one phase which undergoes a crystal melting has a first refractive index and one or more of the phases that do not undergo the crystal melting have a second refractive index, at the ambient below the threshold temperature, the first refractive index is within 0.5% of the second refractive index;

the separated solid phases are transparent as characterized by having a transmittance of at least 70% transmittance (e.g., 70%≤Transmittance≤100%) for electromagnetic radiation having a 600 nanometer wavelength; and above the threshold temperature, the first refractive index is at least 0.6% lower than the second refractive index.

28. A thermochromic material exhibiting switchable optical transmittance via temperature change, wherein if the required temperature change is within seasonal weather changes, the transmittance change would consume low energy or be autonomous.

29. The material of example 28, comprising a solid-state thermochromic phase-changing copolymer film (TPCC) with a large transmittance modulation between room and hot temperatures. The polymer film comprises a hydrophilic poly(hydroxyethyl acrylate) (HEA) crosslinked with a hydrophobic phase-changing poly(hexadecyl acrylate-co-tetradecyl acrylate) (HDA-TA). The TPCC was designed such that the HEA and HDA-TA moieties produce μm-scale phase separation, the HDA-TA moiety undergoes reversible crystalline-to-amorphous transition at 28-32° C., and the refractive indices of the hydrophilic and hydrophobic phases are matched at ambient temperature but are mismatched when temperature is above the transition. The TPCC film showed high $\Delta T_{lum}$, $\Delta T_{solar}$ and $\Delta T_{IR}$ of 68.8%, 62.7% and 55.8%, respectively. The opacity switching was reversible without any decay even after 1000 heating-cooling cycles. The TPCC film was investigated for autonomous and climate-adaptable solar modulation window application.

BRIEF DESCRIPTION OF THE DRAWINGS

Referring now to the drawings in which like reference numbers represent corresponding parts throughout.

DETAILED DESCRIPTION OF THE INVENTION

Figure 1:
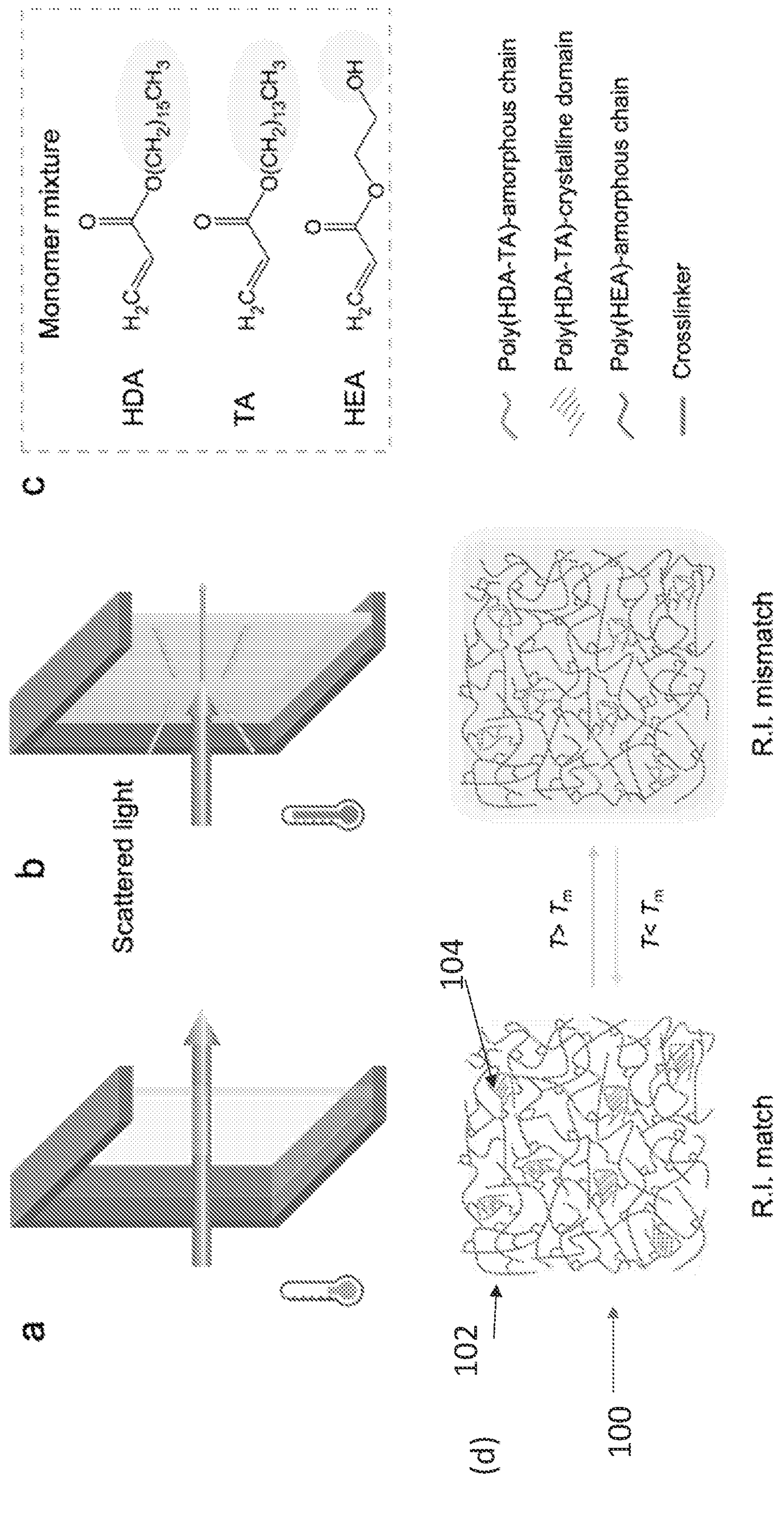
FIG. 1. Design concept illustrating optical transmittance change of TPCC film in response to temperature. (a) TPCC is transparent due to the refractive index (R.I.) match between poly(HDA-TA) and poly(HEA) when poly(HDA-TA) is at its semi-crystalline state at $T<T_m$. (b) TPCC is opaque due to the R.I. mismatch between the poly(HDA-TA) and poly(HEA) when poly(HDA-TA) is at its molten state at $T>T_m$. (c) Monomers used to synthesize the TPCC film. (d) schematic of the film (e) Differential scanning calorimetry results.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

A. Example Structure and Operation

In one or more examples, a smart window (SW) is a glass, glazing, or film whose light transmission properties are altered as a result of temperature change, exposure to certain electromagnetic radiation, application of voltage, and/or other stimuli. The change of transmission properties can result from a change of reflectance, optical absorption, and/or light scattering.

This invention describes a solid state thermochromic polymer film for smart window applications. The polymer film is transparent below a threshold temperature (transition temperature) and becomes opaque above the threshold temperature. The polymer film comprises two or more separated solid phases with matching refractive indices, and appears optically transparent. One of the phases is (semi) crystalline and undergoes a crystal melting above the threshold temperature with a large reduction of its refractive index. The polymer film thus becomes optically opaque above the threshold temperature. This opacity change is reversible and may be repeated for numerous cycles. The crystal melting and its reverse process, recrystallization, are also called a phase change.

In materials science, "separated solid phases" means multiple immiscible domains in a material, each of the separated solid phases with its own distinctive composition and properties. The domains, also called grains, can be distinguished under optical or electronic microscopes.

A smart window or coating based on the said thermochromic polymer film allows light to transmit across the film below the threshold temperature, and becomes less transparent, or opaque, when its temperature rises above the threshold temperature. The threshold temperature is dependent on the crystal melting temperature, and can be varied based on the chemical composition of the (semi) crystalline domain. Melting usually occurs in a temperature range, from as narrow as ±1° C. to as much as ±5° C. or even wider. A narrow melting temperature range is generally desired.

In one or more examples, the thermochromic polymer film can be made of or comprise:

(1) A copolymer prepared from two or more distinctive co-monomers. The polymer film comprises two separated phases. Phase 1 results primarily from co-monomer 1 and phase 2 results primarily from comonomer 2. Phase 1 is semi (crystalline) and becomes amorphous above a threshold voltage as a result of crystal melting (also called phase changing). Phase 2 may be amorphous or semi (crystalline) and does not undergo phase changing during the melting or recrystallization of Phase 1; or (2) a mixture of two or more distinctive polymers. The mixture phase separates. Polymer 1 undergoes crystal melting above a threshold temperature, consequently with large reduction of its refractive index, while polymer 2 does not undergo phase change during the melting of polymer 1. Polymer 1 and polymer 2 may be chemically crosslinked while they are mixed or via post a treatment, such as heating or UV exposure, after the polymer film has been formed; or (3) a mixture of (1) and (2).

The temperature change to induce the opacity change can be caused by environmental temperature change, such as solar flux heating, the presence of a nearby heat source such as an oven or a lamp, or electrical heating. The electrical heating may be administered with the use of a transparent conductor. For instance, a transparent conductive coating of indium tin oxide (ITO) in thermal contact with the thermochromic film may induce uniform heating of the polymer film and consequently uniform change of opacity of the polymer film.

In one specific example, the thermochromic polymer film is transparent at ambient temperature with a parallel transmittance >70%. It becomes translucent or opaque above a threshold temperatures with a parallel transmittance <50%. The threshold temperature of the polymer film in one example is 30° C., and its opacity change occurs from a temperature of 29° C. to a temperature of 32° C.

The thickness of the SW film can be selected from 2 μm up to several millimeters. A Thinner film generally leads to a smaller opacity change.

First Example Polymer Film

In this example, a synthetic polymer film comprising a hydrophilic poly (hydroxyethyl acrylate) (HEA) was crosslinked with a hydrophobic phase-changing poly(hexadecyl acrylate-tetradecyl acrylate) (HDA-TA) to produce an adaptive, broadband, and efficient thermochromic phase-changing copolymer (TPCC) film. This new thermochromic film was designed such that the HEA and HDA-TA moieties produce μm-scale phase separation. The refractive indices of the hydrophilic and hydrophobic phases are matched at ambient temperature. At 28-32° C. and above, the HDA-TA moiety undergoes a reversible crystalline-to-amorphous transition resulting in mismatched refractive indices which strongly scatters light at moiety boundaries. The resulting thermochromic film exhibits high luminous, infrared and solar transmittance modulation with a low transition temperature of 28-32° C.

Figure 1E:
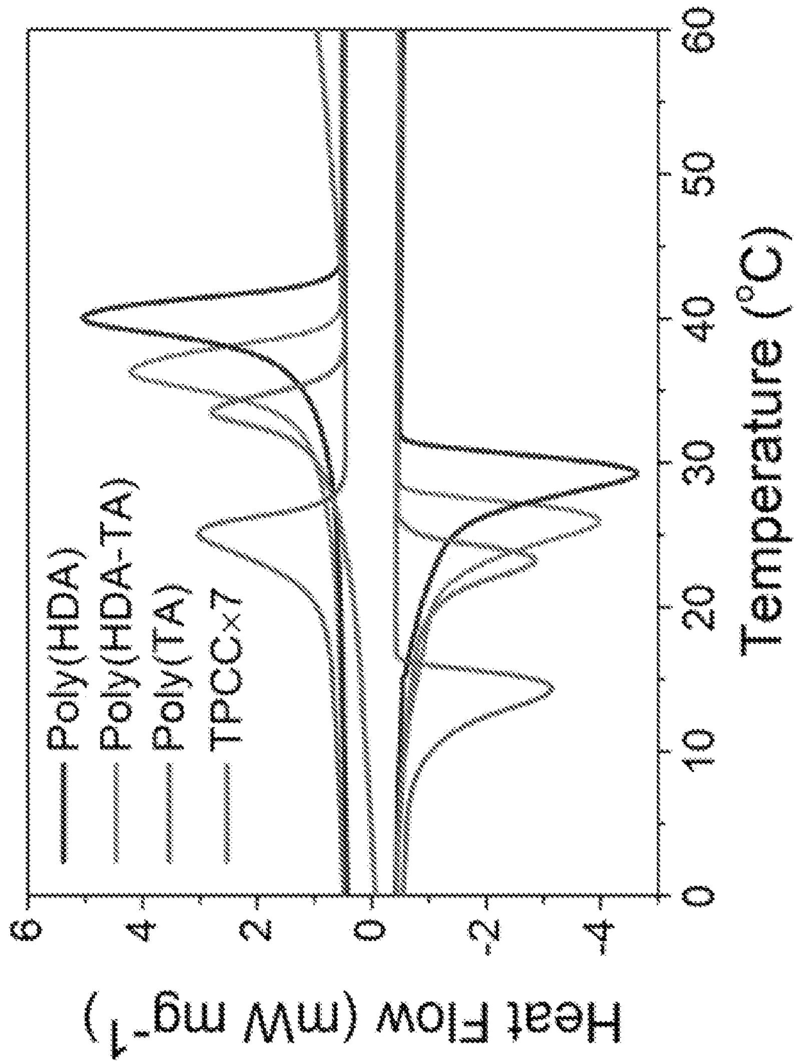

The polymer film is prepared from a mixture of three acrylate compounds and cured under UV light. The precursor solution consists of acrylate compounds, a cross-linker, a photo-initiator and a surfactant. Hexadecyl acrylate (HDA) with long alkyl chains is selected for the phase-changing component due to its sharp and reversible crystalline-to-amorphous transition. However, the cured poly(HDA) film has a $T_m$ around 40° C. as determined by differential scanning calorimetry (see FIG. 1*e*). This temperature is too high for automatic modulation of the final TPCC film. Since cured poly(TA) has a lower $T_m$ of 25.1° C. due to its relatively shorter alkyl chains, it was incorporated to regulate the transition temperature of the phase-changing component poly(HDA-TA) to 36.3° C. at a HDA to TA weight ratio of 4:1. Another acrylate, hydroxyethyl acrylate (HEA), was introduced due to its similar refractive index with the phase-changing component at low temperatures. Trimethylolpropane triacrylate (TMPTA), 2,2-dimethoxy-2-phenylacetophenone (DMPA) and Triton X-100 were employed as a crosslinker, a photo-initiator and a surfactant, respectively. The prepared TPCC film can modulate light as it can reversibly switch between transparent and opaque states as the ambient temperature changes (FIG. 1*a*-*b*). The alkane chains in HDA and TA provide hydrophobicity to the phase-changing component poly(HDA-TA), while the hydroxyl groups in HEA endow poly(HEA) with hydrophilicity. Therefore, the TPCC film 100 is composed of a hydrophilic poly(HEA) phase 102 crosslinked with hydrophobic phase-changing poly(HDA-TA) phase 104 (as illustrated in FIG. 1(*d*), and the weight ratio of HEA to HDA-TA is 6:1 (see further descriptions below for the selection of this weight ratio).

The tunable light management mechanism is dictated by the refractive index match and mismatch. Poly(HDA-TA) is a phase-changing polymer that shows large change of refractive index during the semicrystalline-to-amorphous transition. At $T<T_m$, amorphous poly(HEA) phase shows comparable refractive index with the semicrystalline poly(HDA-TA) phase, which allows the TPCC film to have a high transmittance. At $T>T_m$, the poly(HDA-TA) domain melts, and the amorphous poly(HDA-TA) phase has a lower refractive index than the amorphous poly(HEA). This results in significant light scattering. Furthermore, the difference of hydrophilicity between the two constituent polymers can cause phase separation and produce μm-sized surface patterns, increasing the overall opacity of the TPCC film in the opaque state.

Figure 2:
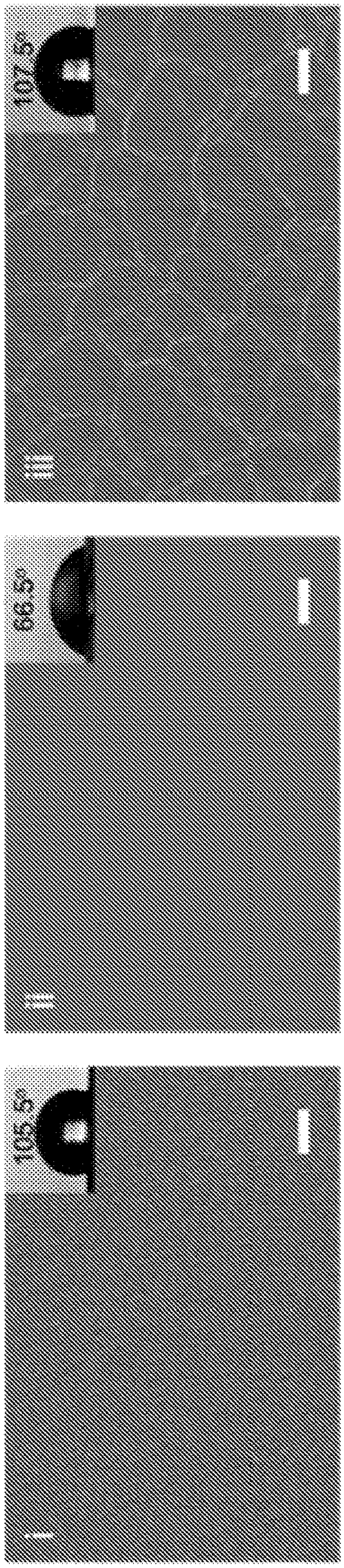
FIG. 2. Material Properties of the TPCC. (a) SEM images of i) poly(HDA-TA) film, ii) poly(HEA) film and iii) TPCC film at ambient temperature. Insets show the contact angle of a water droplet on the films. (b) Refractive indices of poly(HDA-TA), poly(HEA), and TPCC as a function of temperature. (c) XRD analysis of TPCC during heating from 25 to 45° C. (left) and cooling from 45 to 25° C. (right), the heating/cooling rate is 5° C. min-1, and the temperature of each test point is kept for 5 minutes before testing. (d) TPCC film with increasing temperature. The experiment was done at various controlled temperature and TPCC were hold at each temperature for 5 minutes before photographing. (e-g) Optical microscopic images of TPCC films during two switching cycle.
Figure 2:
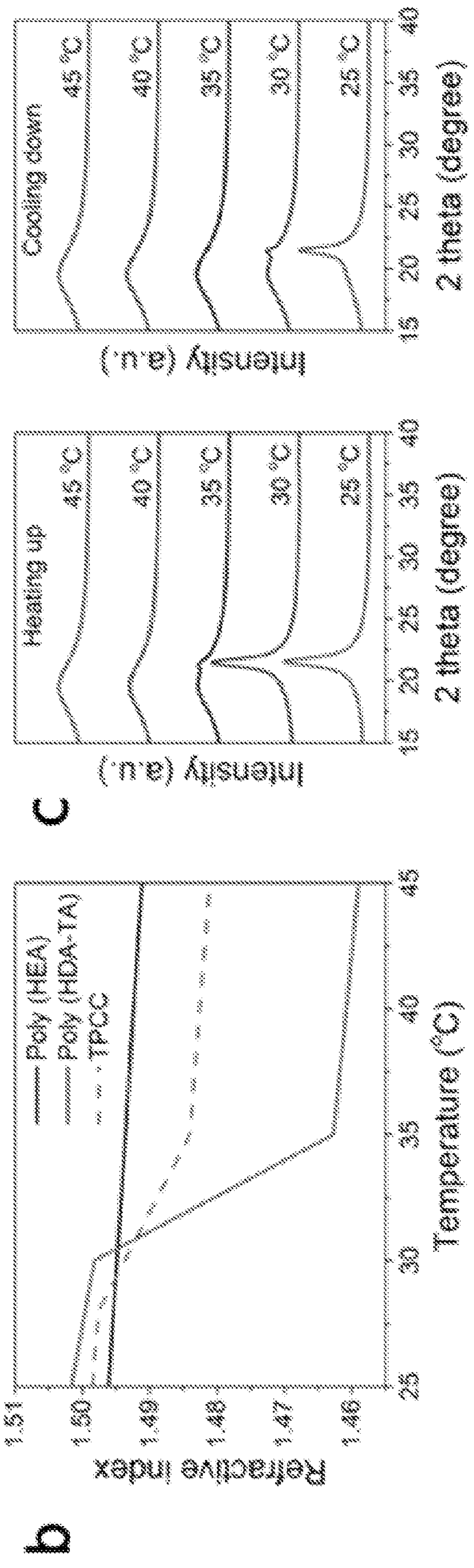
Figure 2:
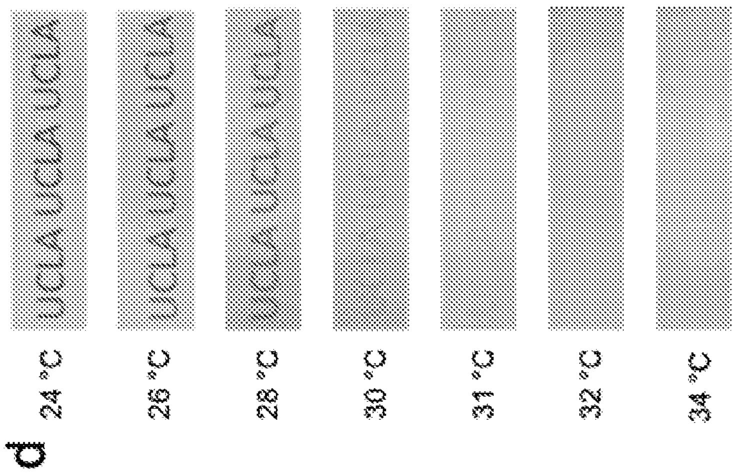
Figures 2E, 2F, 2G, 2H:
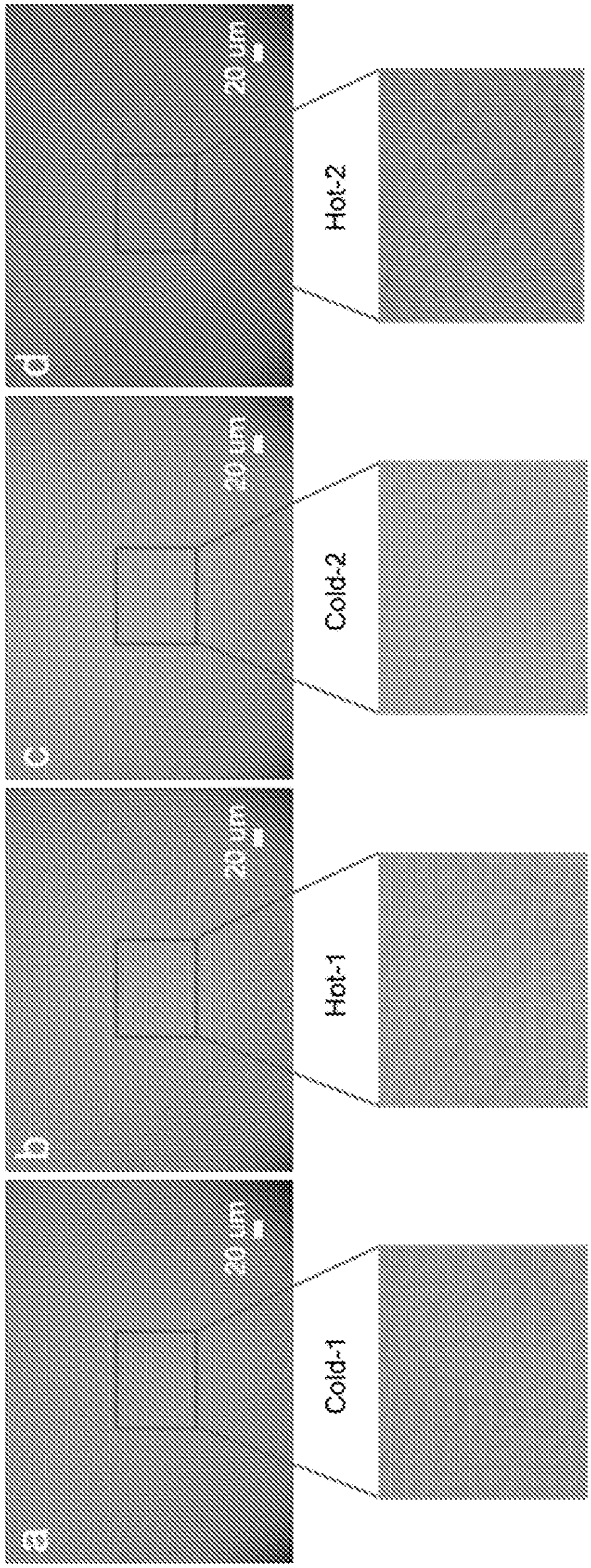

To understand the transparency modulation mechanism, we used scanning electron microscopy (SEM) to reveal the phase separation of poly(HDA-TA) and poly(HEA). Poly (HDA-TA) and poly(HEA) were shown to have a uniform and smooth surface (FIG. 2*a* i and ii). This is due to the fact that poly(HDA-TA) is in a semicrystalline state at ambient temperature, and the crystalline size are on the order of nanometers and cannot be individually observed under the SEM. Poly(HEA) is even more smooth because it is an amorphous polymer that contain amorphous regions where molecules are randomly arranged. Contact angle tests showed that poly(HEA) and cured poly(HDA-TA) have a large difference in hydrophobicity. The cured HEA is hydrophilic (θ≈66.5°) due to its hydroxyl groups, while cured HDA-TA is hydrophobic (θ≈105.5°) because of the long alkyl chains. The TPCC shows hierarchical micrometer size phase separation patterns (FIG. 2*a* iii). The micrometer size phase separation patterns can help scatter the full solar spectrum. Although the hydrophilic poly(HEA) accounts for the majority of the content in the TPCC, the TPCC is nevertheless hydrophobic (θ≈107.5°). It has been reported that for composite materials, the hydrophobicity is related to surface morphology and initial hydrophobicity. In some cases, surface morphology is more critical than initial hydrophobicity as an initially hydrophilic surface can exhibit superhydrophobicity under certain conditions.[31] On the SEM images of the TPCC films shown in FIG. 2*a* (iii), the bright, continuous and thin networks are considered to be the poly(HDA-TA) domains, and while they account for just 14% of the total weight of the TPCC, the hydrophobicity of the TPCC is caused by these hydrophobic structures on the surface. Surface morphology was further imaged in-situ under optical microscope during two heating and cooling cycles. FIG. 2*e* shows the surface morphology of the TPCC film at room temperature when the film is transparent, the μm-sized patterns can be clearly observed. After heat is applied, the surface patterns became more distinctive (FIG. 2*f*), which is consistent with the opaqueness of the film. At the hot state, the refractive index mismatch and phase separation between the HEA and HDA-TA moiety collectively contribute to the opaqueness. In the second heating and cooling cycle (FIG. 2*g*-*h*), the phase separation pattern is still maintained on the surface, because the chain segments of HEA and HDA-TA are crosslinked preventing the long-distance movement of the two components and the significant re-structuring of phase separation.

Since the TPCC film's tunability revolves around the refractive indices of its components, we measured the refractive indices of the neat poly(HEA) and the neat poly(HDA-TA) films with increasing temperature using a prism coupler. FIG. 2*b* shows that the refractive index of the neat poly (HEA) film shows a featureless decline from 1.496 at 25° C. to 1.491 at 45° C. With the increase of temperature, the refractive index of pure poly(HDA-TA) film begins to decrease gradually until 30° C. when the nanocrystalline HDA-TA moiety starts to melt, and the refractive index drops sharply from 1.498 at 30° C. to 1.462 at 35° C. As a consequence, the copolymer of HEA and HDA-TA in the TPCC film at room temperature has a quite similar refractive index (0.13% difference) between the HEA domain and the HDA-TA domain, leading to a high transparency despite μm-scale phase separation. From 30° C. to 35° C., the refractive index contrast increases sharply, leading to high opacity for the TPCC film. The phase transition of the poly(HDA-TA) domain starts at 28° C., lower than that of neat poly(HDA-TA) due to the low content of this phase transition material in the TPCC. The slope of the refractive index decline of TPCC in the phase changing temperature range is also smaller than the neat poly(HDA-TA).

The rapid decline of refractive index of poly(HDA-TA) is related to semicrystalline-to-amorphous transition. Variable temperature X-ray diffraction (XRD) analysis was performed to observe the phase transition (FIG. 2*c*). At 25° C., poly(HDA-TA) showed a typical (100) diffraction peak located at 2θ of ~21.4°, indicating good crystallization properties of poly(HDA-TA).[32] Based on the Schererr equation, the crystal size was calculated to be between 7.99 and 9.97 nm, The highly ordered crystalline phase was maintained when the temperature increased to 30° C. When temperature further increased to 35~45° C., the intensity of the characteristic peak decreased significantly and the peak finally shifted to ~19.5° with broader width, implying the crystalline domains were dissociated to amorphous phase. This process is reversible; when the temperature dropped from 45 to 25° C. at a cooling rate of 10° C. $min^{-1}$, the intensity and center of the characteristic peak returned to its initial state, indicating the crystalline domains were rapidly and completely regenerated.

To further monitor the phase transition property, differential scanning calorimetry (DSC) curves of poly(HDA-TA) and TPCC samples at a heating/cooling rate of 15° C. $min^{-1}$ from 0 to 60° C. was examined (Figure S1). The DSC diagrams show a characteristic melting peak during heating and a recrystallization peak during cooling for each sample. The melting transition temperature ($T_m$) as defined by the peak value is 40.0° C. for poly(HDA) and 25.1° C. for Poly(TA). The difference in $T_m$ is because HDA has a longer alkane chain than TA, so the melting process requires more energy. The $T_m$ of poly(HDA) is tuned down by copolymerizing with poly(TA) with a shorter alkane chain. The $T_m$ of poly(HDA-TA) copolymers are optimized at 36.3° C. with HDA:TA weight ratio of 4:1, and the resulting $T_m$ of the TPCC is 33.4° C. The specific melting enthalpy (A/m) was estimated by integrating the heat flow peak divided by the mass of each sample (Table 1). Note that TPCC is composed of 6:1 HEA:(HDA-TA), So here, the DSC curve of TPCC is multiplied by 7 for comparison with other samples. The A/m value is 30.9, 19.7, 29.3 and 17.9 J $g^{-1}$ for poly(HDA), poly(TA), poly(HDA-TA) and TPCC, respectively. To further compare the degree of crystallinity, the $\Delta H_m$ of per mol of alkyl side chain was calculated because the crystallization of these phase changing polymer occurs mainly in the long n-alkyl side chain.[33] The calculated $\Delta H_m$ per mol of side chain value is 0.180, 0.136, 0.176 and 0.108 J $mol^{-1}$ for poly(HDA), poly(TA), poly(HDA-TA) and TPCC, respectively. The lower $\Delta H_m$ per mol of alkyl chain for poly(TA) in comparison with poly(HDA) could be attributed to less side chain carbons are able to crystallize in TA than that in HDA. The low $\Delta H_m$ per mol of side chain of the TPCC may be explained by the constrained crystallization of the alkyl chains due to chemical crosslinks and confined domain size in the TPCC.

TABLE 1

DSC results for the samples. Since the previous thermal history of a polymer affects the measured properties, All samples were initially heated to 60° C. and then cooled naturally before DSC measurements to provide an equivalent thermal history for all four samples. The weight of the four samples was controlled at approximately 5 mg, the $\Delta H_m$ represent the melting enthalpy on DSC heating curve, was calculated by integrating the peak area in the DSC thermogram.

| Sample | Endo Peak (° C.) | $\Delta H_m$ (J $g^{-1}$) | $\Delta H_m$/mol(side chain) (J $mol^{-1}$) |
|---|---|---|---|
| Poly(HDA) | 40.0 | 30.9 | 0.180 (100%)* |
| Poly(TA) | 25.1 | 19.7 | 0.136 (77.3%) |
| Poly(HDA-TA) | 36.3 | 29.3 | 0.176 (97.8%) |
| TPCC | 33.4 | 17.9* | 0.108 (60.0%) |

*Multiplied by 7 (as the phase changing poly(HDA-TA) is 1/7 of the TPCC weight.
Relative to poly(HDA).

In order to observe the transition temperature of TPCC more intuitively, the TPCC film was photographed during temperature increase as shown in FIG. 2*d* where the "UCLA" pattern is placed directly under the TPCC film. At 24° C., the film is transparent, and the "UCLA" patterns can be seen clearly through the TPCC film as it remains transparent at 26° C. The "UCLA" patterns begin to blur at 28° C. and becomes more blurred at 30° C. At 32° C. and above, the patterns are invisible.

Figure 3:
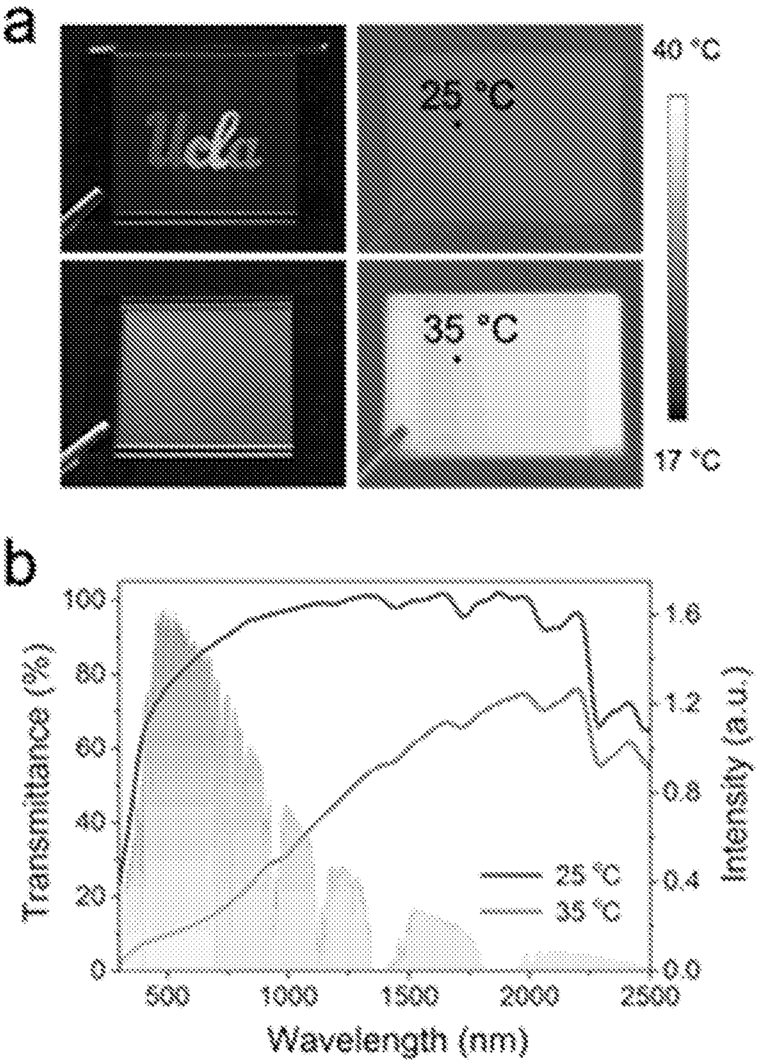
FIG. 3. Transmittance Performance of the TPCC. (a) Visible images and corresponding thermal infrared images of a 2×3 inch TPCC device at transparent and opaque states. The TPCC was placed on a pre-heated hotplate and then taken off and photographed in air. Temperature of the TPCC is measured based on the infrared images. (b) Transmittance spectra of TPCC with a layer thickness of 170 μm at 25° C. and 35° C., respectively, the inset is the solar irradiance spectrum (gray area). (c) Light modulation capabilities. (d) Transmittance modulation performance comparison, This work is compared with the best reported thermochromic smart windows: $VO_2$-based films, liquid crystals hybrid films, perovskite, ionic liquid and hydrogel. (e) The transmittance at 550 nm and 1100 nm of TPCC measured for over 1000 heating-cooling cycles. (f) Transmittance modulations of the TPCC measured for over 1000 heating-cooling cycles. (g) Transmittance spectra of poly(HEA) at cold and hot states, respectively, wherein the transmittance is greater than 100% since the reference here is double glass with spacer of 170 μm. (h) Transmittance spectra of poly(HDA) at cold and hot states, respectively, wherein the inset is the solar irradiance spectrum and the transmittance is greater than 100% since the reference here is double glass with spacer of 170 μm. (i) Transmittance spectra of poly(HDA-TA) at cold and hot states, respectively, wherein the inset is the solar irradiance spectrum and the transmittance is greater than 100% since the reference here is double glass with spacer of 170 μm. (j) Transmittance spectra of the prepared film with different weight ratio of HEA to HDA-TA. The solid line is at cold state, while the dash line is at hot state. (k) Transmittance spectra of TPCC measured for over 1000 heating-cooling cycles, wherein the first five cycles and the last five cycles were recorded. (l) Optical images of TPCC at −10° C. (m-o) Stability of TPCC under UV irradiation. The lamp features 100 watt longwave (365 nm) bulb and TPCC was exposed to UV light for 12 hours every day, and then kept in dark for 12 hours, cycling for 10 days. (m-n) The transmittance at 550 nm and 1100 nm of TPCC measured for over 10 days cycles respectively. The blue and red marks indicate that it is at cold and hot state respectively. (o) Optical images of TPCC after 10 days under UV irradiation. (p) The surface temperature of ITO heater and TPCC surface during the heating-cooling process.
Figure 3:
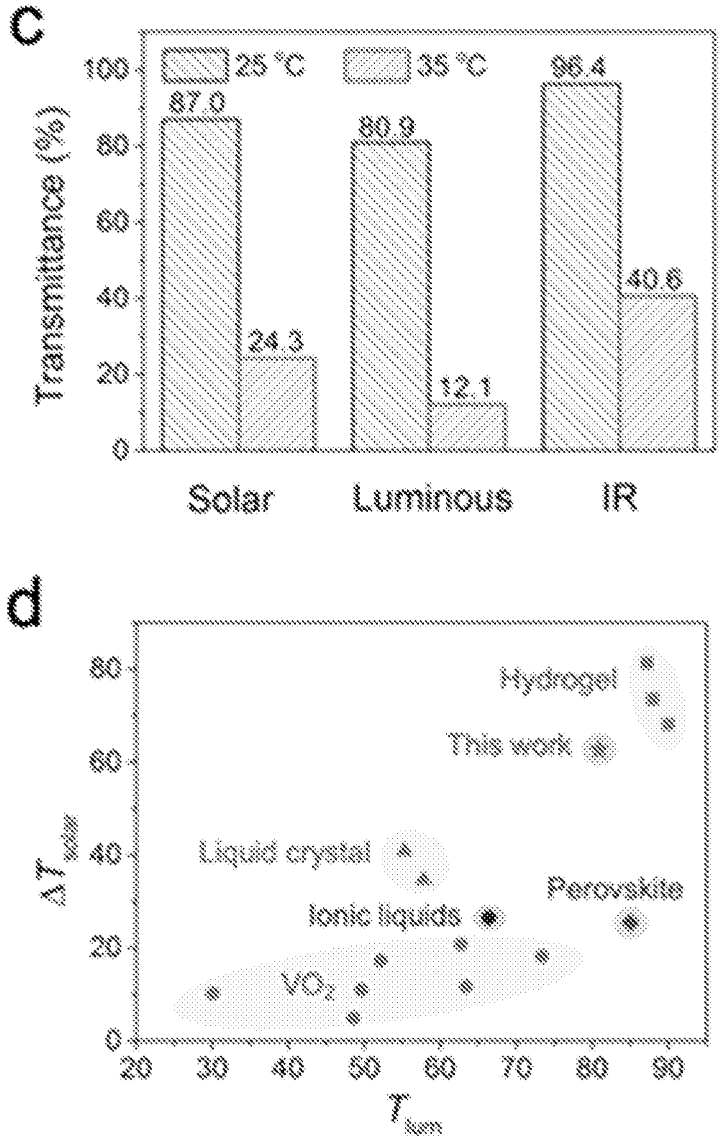
Figure 3:
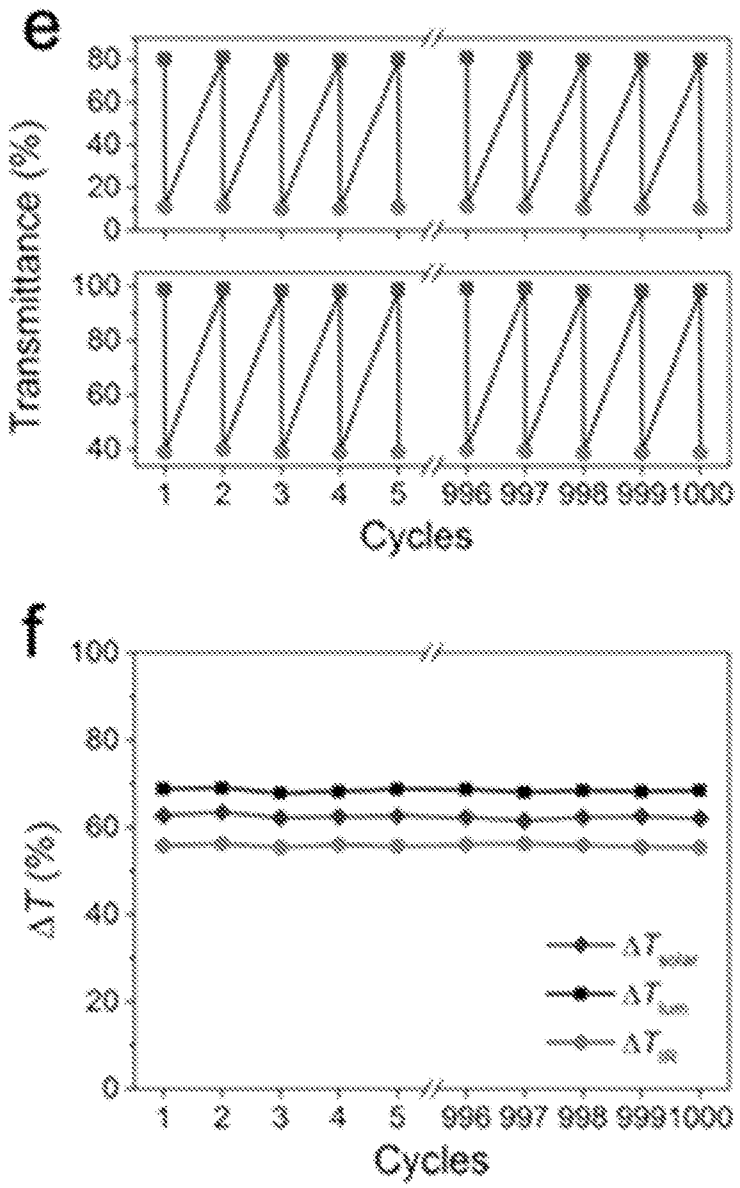

FIG. 3*a* shows optical images and the corresponding thermal infrared images of a 2×3 inch TPCC film before and after the phase change. At 25° C., the colored "UCLA" logo can be visually seen through the TPCC film. When the temperature rises to 35° C., the TPCC film becomes opaque, and the colored "UCLA" logo behind it cannot be seen. The IR images show the changes in temperature of the TPCC before and after phase change. The homogenous temperature distribution also confirms the uniformity of TPCC film to a certain extent.

Figure 3G:
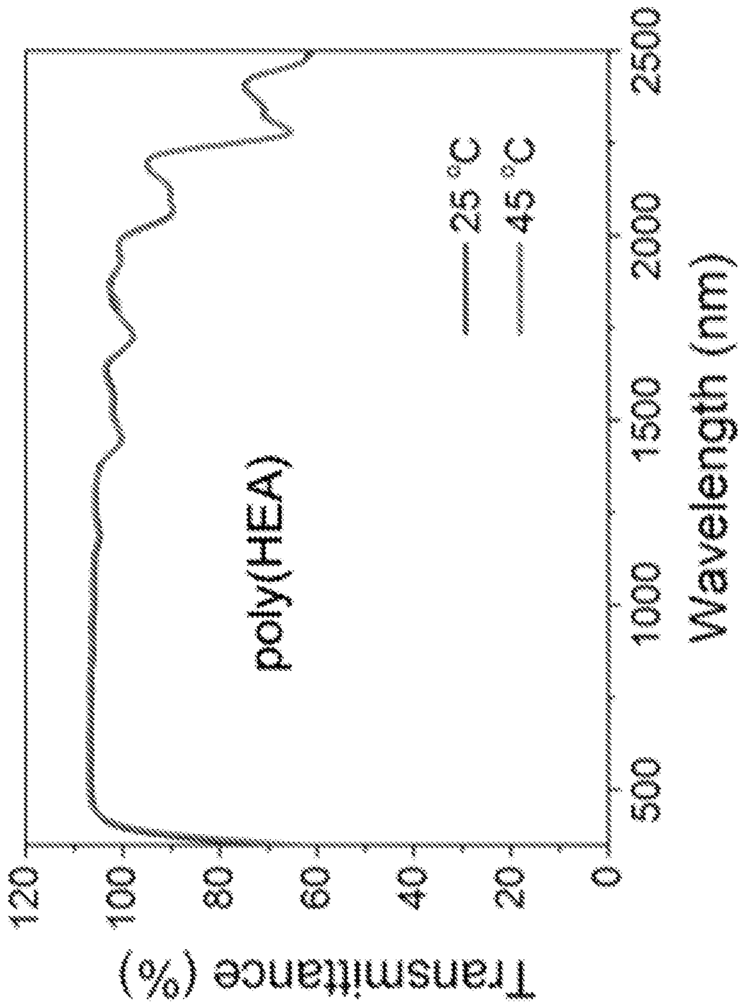
Figure 3H:
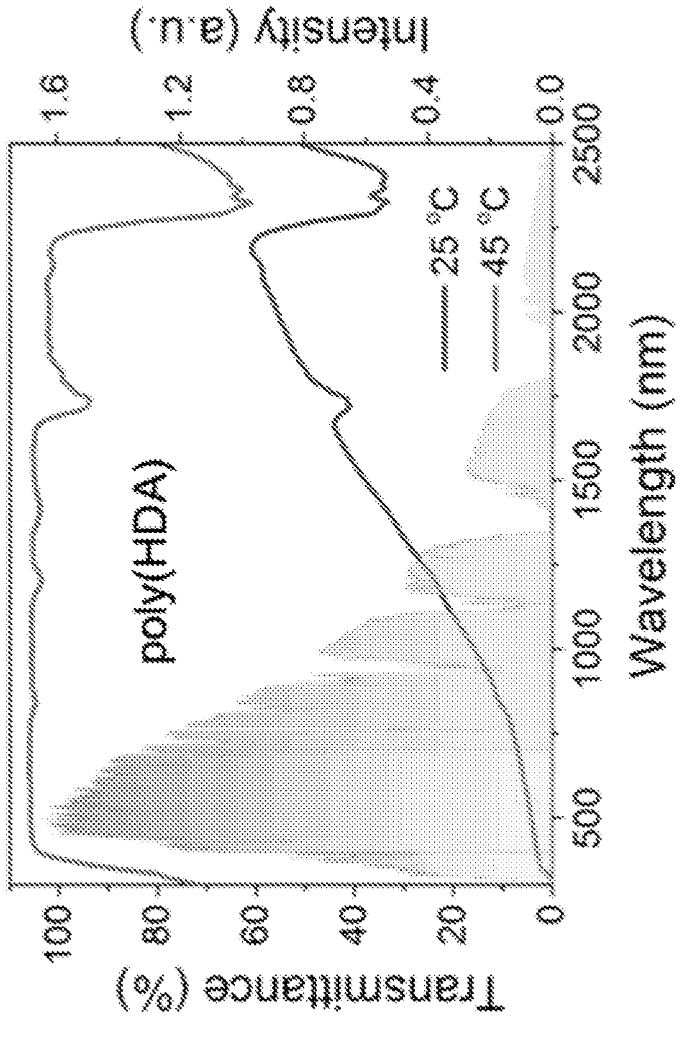
Figure 3I:
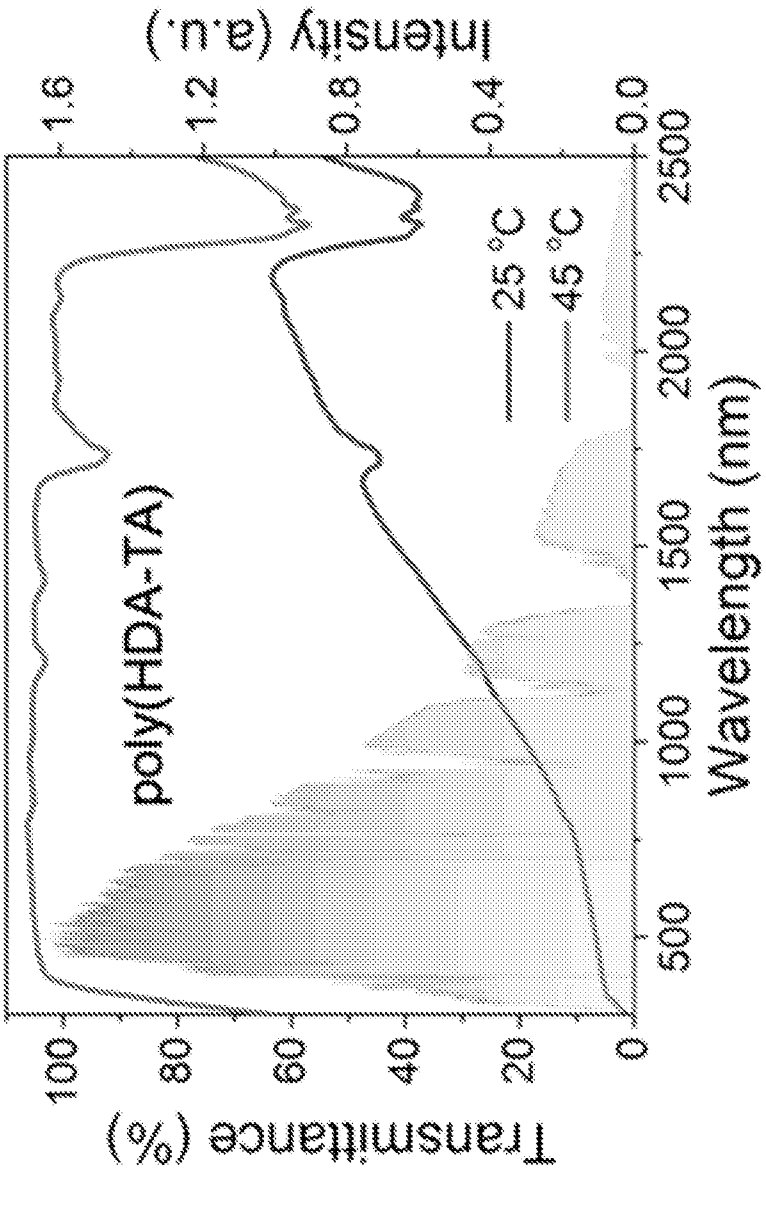
Figure 3J:
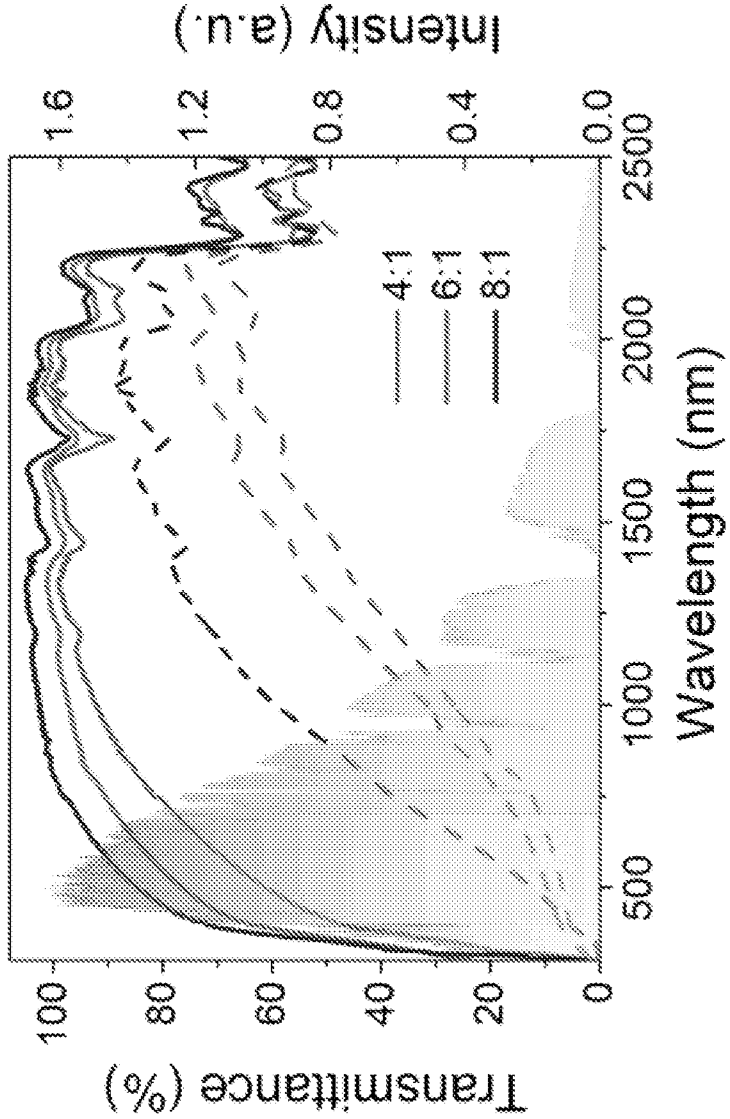

A neat poly(HEA) film is always transparent due to the amorphous state and cannot provide transmittance modulation throughout the whole solar spectrum (FIG. 3*g*). Poly (HDA) and poly(HDA-TA) both show good modulation ability of sunlight (FIGS. 3*h* and 3*i*). However, they are opaque at low temperature and transparent at elevated temperature. Neat poly(HDA) and poly(HDA-TA) are not appropriate for smart window applications due to their low transmittance at low temperature. The opaqueness at low temperature is due to the semicrystalline state of the polymer and strong light scattering by the polymer crystallites. For the TPCC film, the weight ratio of HEA to HDA-TA is 6:1. When the concentration of HEA is higher than 6:1, the transmittance modulation is poor because the HDA-TA component is too low in the copolymers to generate significant light scattering; high HEA content hinders the crystallization of HDA-TA, thus reducing the opacity of the film at the opaque state. On the other hand, high concentration of HDA-TA could reduce the transparency at the transparent state (FIG. 3*j*). In this work, the HEA to HDA-TA ratio of 6:1 was used to trade off between transparency at low temperature and transmittance modulation ability.

The TPCC film is transparent at low temperature before the phase transition of the HDA-TA moiety and opaque at high temperature after the phase transition. The HEA and HDA-TA domains are phase separated on the μm-scale. The refractive index matching of the HEA and HDA-TA domains below $T_m$ leads to high transparency, while the refractive index mismatch above $T_m$ enhances Mie scattering effect. The measured transmittance spectra of the TPCC device (300-2500 nm) with a TPCC film thickness of 170 μm are showed in FIG. 3*b*. In the cold state at 25° C., the transmittance is pretty high in solar radiation spectrum. The $T_{solar}$, $T_{lum}$, and $T_{IR}$ are as high as 87.0%, 80.9% and 96.4% respectively (FIG. 3*c*). By increasing the temperature to 35° C., the measured $T_{solar}$, $T_{lum}$, and $T_{IR}$ drops sharply to 24.3%, 12.1% and 40.6%, contributing to a $\Delta T_{solar}$, $\Delta T_{lum}$, and $\Delta T_{IR}$ of 62.7%, 68.8% and 55.8%, respectively. Furthermore, as shown in FIG. 3*d* and Table 2, the $T_{lum}$ and $\Delta T_{solar}$ properties of TPCC films are superior to the most of existing thermochromic smart windows including $VO_2$-based films, liquid crystals hybrid films, perovskite and ionic liquid, but lags behind the hydrogels.

TABLE 2

Comparison of this work with previously reported technologies.

| System | $T_{sol\text{-}L}$(%) | $\Delta T_{sol}$ (%) | $\Delta T_{lum\text{-}L}$ (%) | $\Delta T_{lum}$ (%) | $T_{IR\text{-}L}$ (%) | $\Delta T_{IR}$ (%) | $T_C$ (° C). |
|---|---|---|---|---|---|---|---|
| pNIPAm-AEMA hydrogel[22] | ~84.1 | 81.3 | ~87.2 | ~87 | 81.6 | 75.6 | 32 |
| pNIPAm hydrogel/water[24] | | 68.1 | 90 | | | | 32 |
| PNIPAm Si/A1 hybrid hydrogel[23] | | 73.5 | 88 | 80.1 | | 66.2 | |
| W-doped $VO_2$[34] | | 11.7 | 63.4 | | | | 42.7 |
| W-Zr-codoped $VO_2$ foil[35] | | 4.9 | 48.6 | | | | 28.6 |
| $V_xW_{1-x}O_2$@$SiO_2$[15] | 56.7 | 17.3 | 52.2 | 3.9 | | | 40.4 |
| $VO_2$/CLETS[36] | 66.1 | 20.8 | 62.7 | 7.0 | | | 80 |
| $SiO_2$/$VO_2$ film[13] | | 11.0 | 49.6 | | | | 35 |
| $VO_2$/NLETS hybrid film [14] | | 18.2 | 73.4 | | | | 42 |
| $TiO_2$/$VO_2$/$TiO_2$[16] | 33.8 | 10.2 | 30.1 | | | | 61.5 |
| Liquid crystal/W-$VO_2$ NCs[19] | | 34.6 | 57.8 | | | | 43.2 |
| Liquid crystals/$VO_2$/graphene[20] | | 40.9 | 55.3 | | | | 42.3 |
| Liquid crystal/ITO NCs[21] | | | | 76.5* | | | 29-32 |
| IL-Ni-Cl complexes[17] | | 26.5 | 66.4 | | | | 80 |
| Perovskite[18] | | 25.5 | 85 | 50.7 | | | 42.5 |
| TPCC (This work) | 87.0 | 62.7 | 80.9 | 68.8 | 96.4 | 55.8 | 32 |

*Not normalized based on equation 2

Figure 3K:
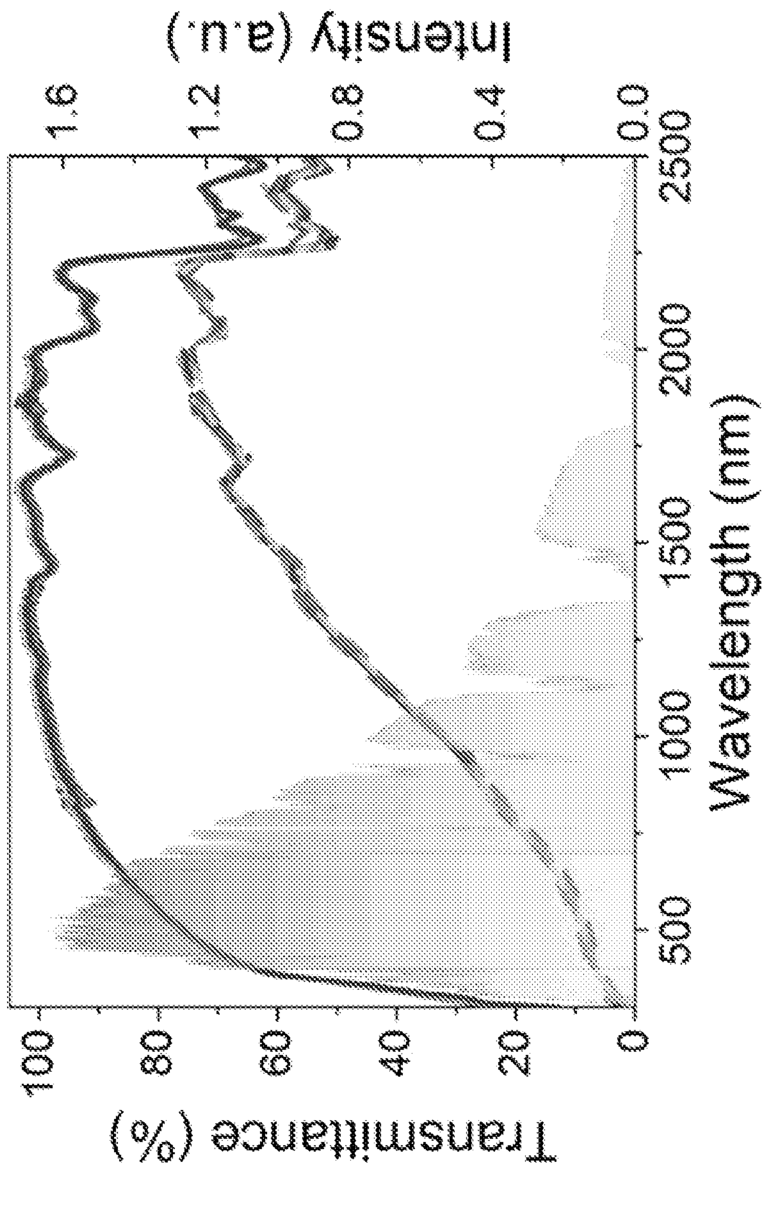
Figure 3I:
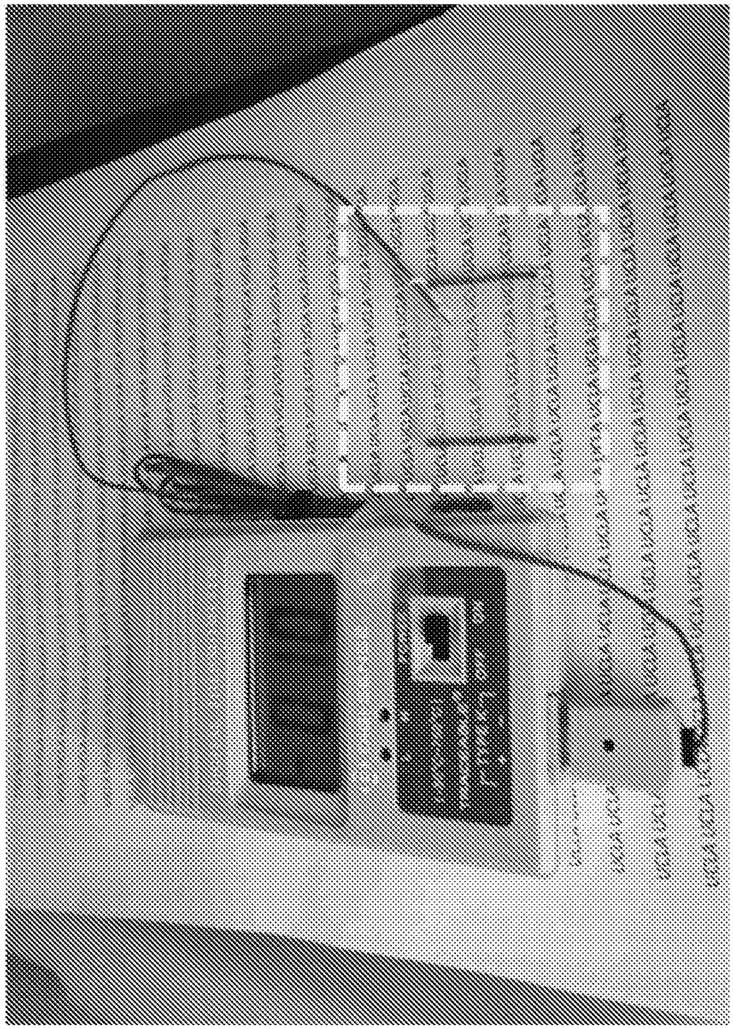
Figure 3M:
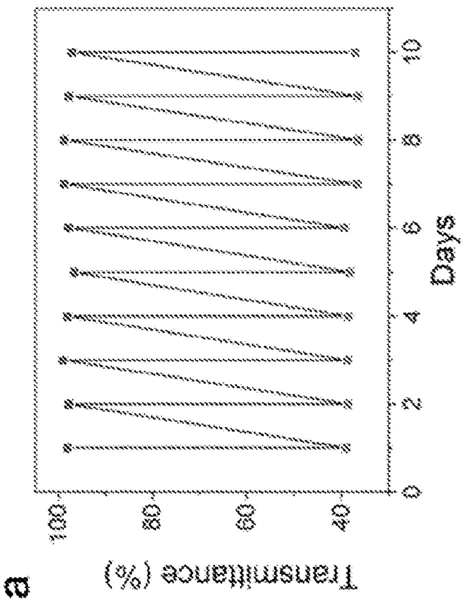
Figure 3N:
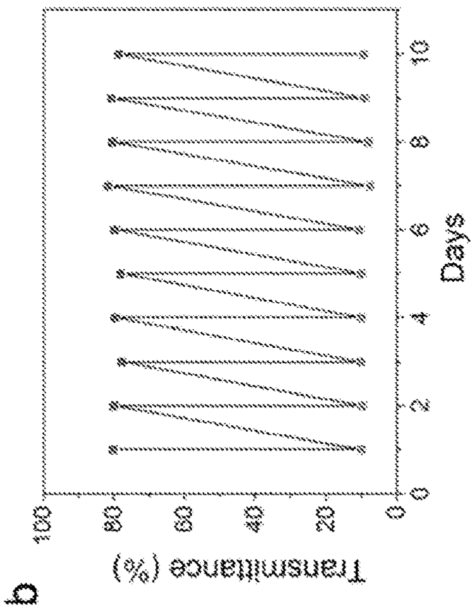
Figure 3O:
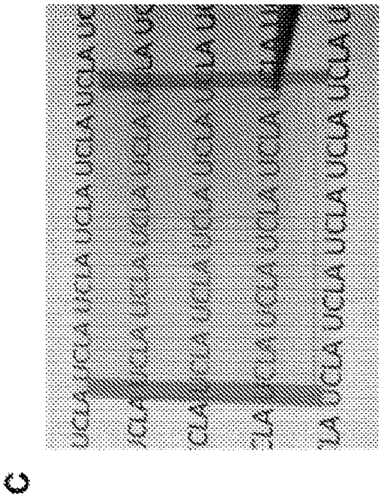
Figure 3P:
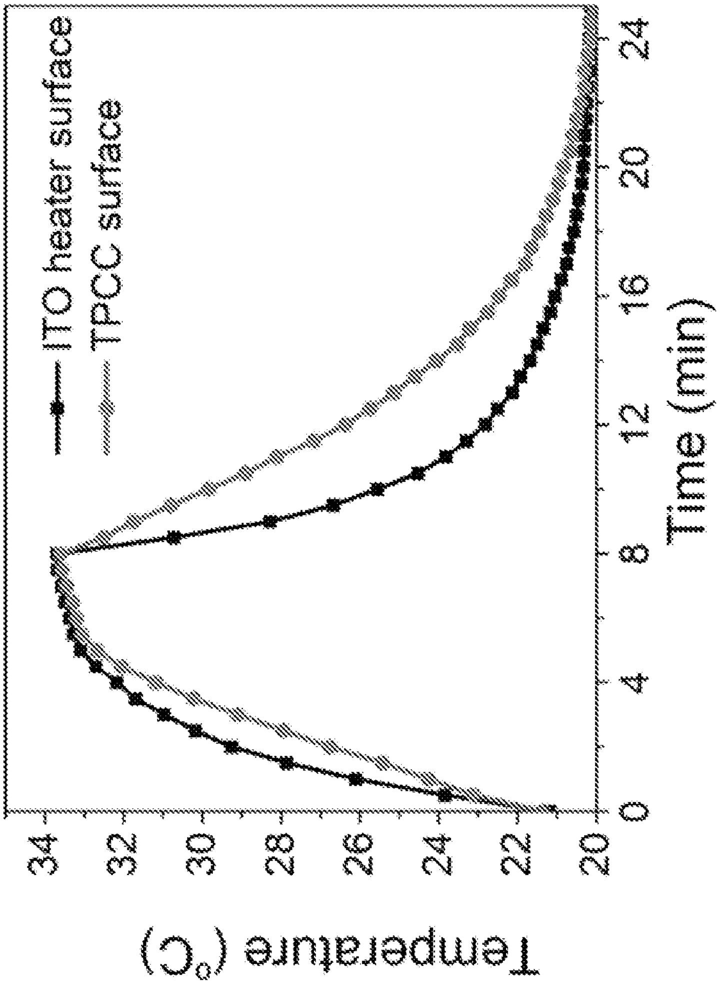

To demonstrate the reversibility of the transparency switching, 1000 cycles of heating-cooling test were carried out on the TPCC film (FIG. 3*e-f* and FIG. 3*k*). FIG. 3*e* shows the transmittance of the first five cycles and the last five cycles at 550 nm and 1100 nm. FIG. 3*f* shows the calculated transmittance modulation. The transmittance remains consistent in both the opaque and transparent states of the TPCC for over the 1000 cycles. No obvious contrast decrease was observed on the transmittance modulations, thus demonstrating the robust reversibility of the TPCC film. Additionally, the TPCC remained transparent at −10° C. (FIG. 3*l*). The TPCC were left under a UV lamp (365 nm) with 100 Watt for 10 days and showed little degradation, the transmittance remained stable and the appearance of the TPCC was still intact and transparent (FIG. 3*m*-3*o*). We have also shown that the TPCC undergoes a process from transparent to opaque to transparent when the TPCC is placed on a ITO/glass heating plate. When a voltage of 6 V is applied to the ITO heater, the TPCC film becomes opaque and blocks "UCLA" patterns underneath. When the voltage is turned off and the TPCC film gradually cools to room temperature, it returns to its transparent state and the "UCLA" pattern becomes visible. The transition from transparency to opacity took a few minutes, and the cooling process also takes several minutes to complete the transition. FIG. 3*p* shows the surface temperature of the ITO and TPCC during the heating-cooling process. In addition, the heating and cooling rate of TPCC is slightly slower than that of ITO, which may be due to low thermal conductivity of TPCC than that of glass. When the TPCC was placed on a preheated hot plate, the opacity change took less than a minute to complete. The switching back to the transparent state was even faster if the hot film put on a metal plate at room temperature.

Figure 4:
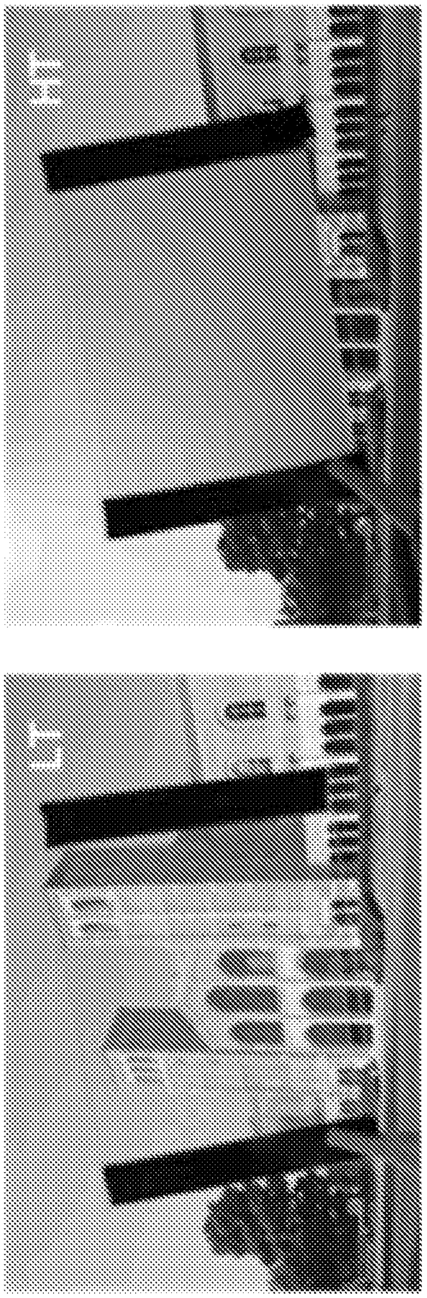
FIG. 4. Solar Energy Shielding Performance of the TPCC. (a) Photographs of a 2"×3" TPCC film at an ambient temperature of 25° C. and 35° C. (b) Photo of the measurement setup. Two identical chamber with doubles-pane glass and TPCC as windows respectively were exposed to solar irradiation. (c) Schematic of the steady-state temperature test inside the model chamber with solar radiation. (d) Temperature profiles of a thermometer inside the model chamber affixed with doubles-pane glass or TPCC device as the window.
Figure 4:
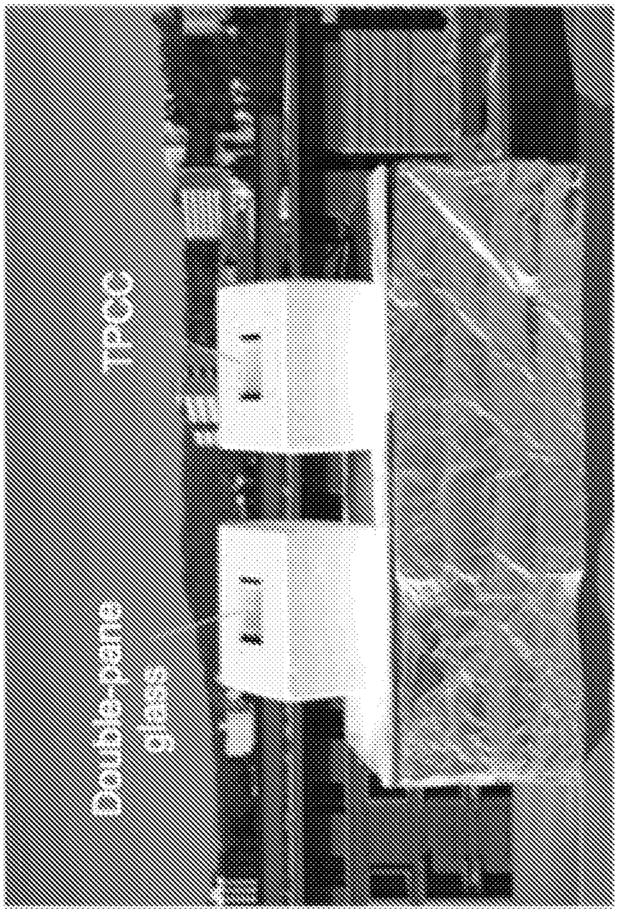
Figure 4:
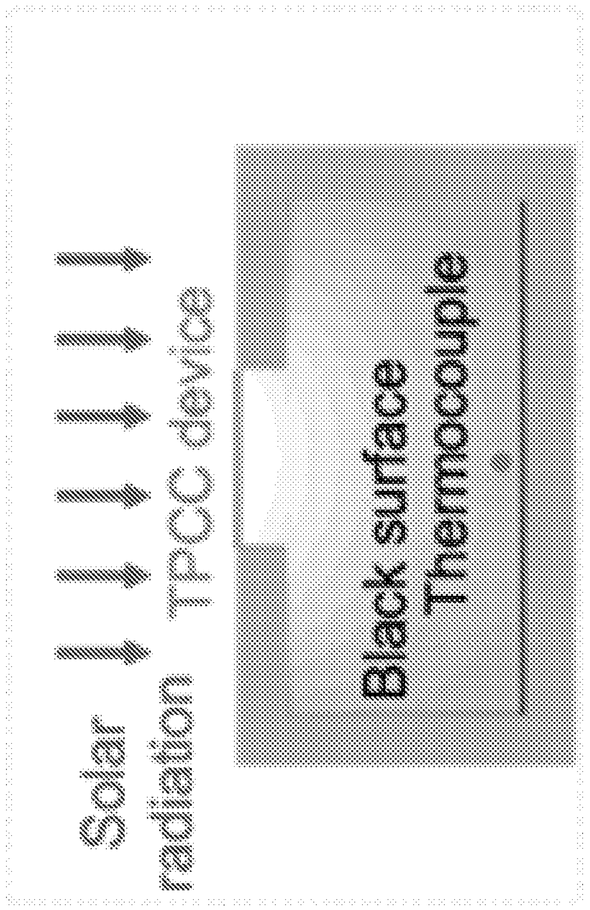
Figure 4:
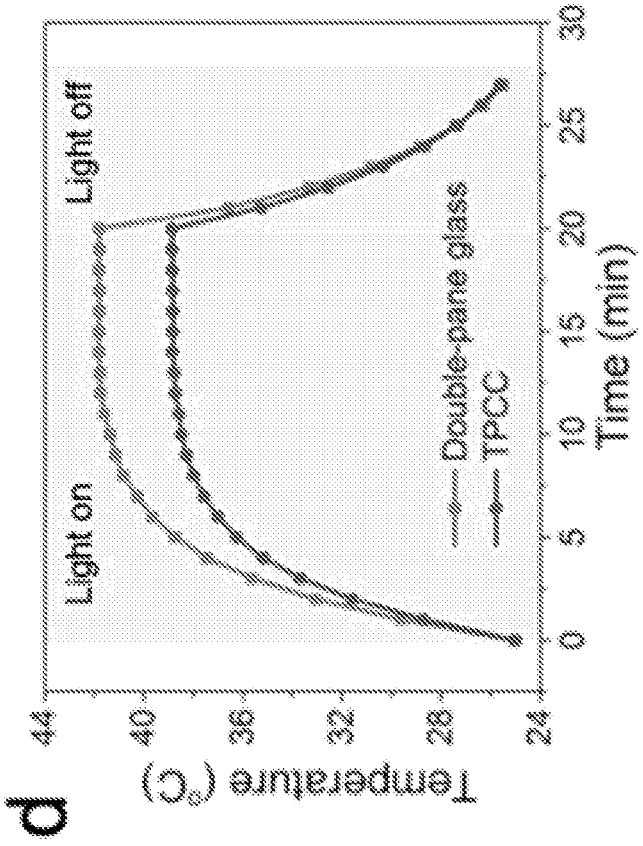

FIG. 4*a* shows a TPCC film with two parallel frames as supports for the softened state. The TPCC film was transparent when the temperature was low and the building in the background can be clearly seen. When the ambient temperature increased, the film was triggered to be opaque and the building in the background was completely blocked. In an initial evaluation of the TPCC film for smart windows, two insulating environmental chambers were fabricated using polystyrene styrofoam as the wall. A black vinyl tape was placed on the inside floor of the chambers. A small opening was made on the top of the sheet to mount the TPCC film. A thermocouple was placed inside the chamber to monitor the temperature change inside the chamber under 1 sun, air mass 1.5 illumination. A double-pane glass was employed as a control window for the comparative study (FIG. 4*b-c*). FIG. 4*d* shows the temperature change in the chamber as a function of the irradiation time. The initial temperature of 25.0° C. of the chamber with double-pane glass rapidly increased to 41.4° C. after 10 min of illumination. However, in the case of the chamber with TPCC, the temperature gradually rose to 38.4° C. after 10 min, which is 3.0° C. lower than that of the control window. This behavior is attributed to the scattering of the incident light caused by the phase transition of the copolymer that occurred above the $T_m$ along with a transition of the smart window from transparent to opaque. The temperature of the two chambers almost remained stable after 10 additional minutes of illumination due to the strong and stable sunlight intensity. After turning off the solar simulator light, the interior temperature in both chambers dropped sharply to 25.4° C. in a few minutes due to the rapid heat dissipation.

The hydrophilic HEA and hydrophobic HDA-TA are phase separated in the TPCC film. The refractive indices of the two phase domains are matched at ambient temperature, leading to a transparent film. The HDA-TA moiety undergoes reversible crystalline-to-amorphous transition at 32° C., and its refractive index at the amorphous state above 32° C. is smaller than the HEA phase, resulting in high opacity. The $T_{lum}$ of the TPCC film is 80.9% in the cold state and drops to 12.1% above 32° C. The TPCC film showed high $\Delta T_{lum}$, $\Delta T_{solar}$ and $\Delta T_{IR}$ of 68.8%, 62.7%, and 55.8%, respectively. The opacity switching was maintained even after 1000 heating-cooling cycles. There is room to further modify the phase separated domain sizes and refine the refractive indices to further improve both the $T_{lum}$ and broadband transmittance modulation to meet the requirements of a variety of applications including smart windows for energy savings, optical modulators and display technologies.

Methods Used for the First Example

Materials: Hydroxyethyl acrylate (HEA), 2,2-Dimethoxy-2-phentlacetophenone (DMPA), Triton X-100 and trimethylolpropane trimethacrylate (TMPTA) were purchased from Sigma-Aldrich. Hexadecyl acrylate (HDA) and tetradecyl acrylate (TA) were purchased from TCI.

Fabrication of TPCC films: Hydroxyethyl acrylate (HEA), hexadecyl acrylate (HDA), tetradecyl acrylate (TA) were mixed with 1.714, 0.223 and 0.058 g, then 0.02 g (1 wt %) TMPTA was added as cross-linker, then 0.02 g (1 wt %) Triton X-100 was added as surfactant and 0.02 g (1 wt %) DMPA was added in as a photo-initiator. The whole mixture was placed on a hot plate and heated to 60° C. to render a clear solution, and followed with thorough sonication for 20 min. The TPCC film was fabricated by injecting the clear solution between two glass slides separated by spacers with thickness of 170 μm and then cured under UV light for 3 mins. For comparison, poly(HEA) and poly(HDA) were prepared through similar method with only HEA or HDA monomer and photo-initiator. Poly(HDA-TA) was prepared with the weight ratio of HDA and TA of 4:1.

TABLE 3

The weight of each component in the experiment. The total weight of HEA, HDA and TA was controlled as 2.0 g.

| HEA:(HDA-TA) | HEA (g) | HDA (g) | TA (g) |
|---|---|---|---|
| 4:1 | 1.600 | 0.320 | 0.080 |
| 6:1 (IPCC) | 1.714 | 0.223 | 0.058 |
| 8:1 | 1.778 | 0.178 | 0.044 |

SEM images were obtained on scanning electron microscope. (FEI Nova Nano 230) Optical microscope images were observed using a Zeiss microscope. Water contact angles were performed on an APPR telescope-goniometer. Transition temperature were characterized by PerkinElmer differential scanning calorimeter (DSC 8000) under nitrogen atmosphere from 0 to 60° C. at a heating or cooling rate of 15° C. $min^{-1}$. Refractive indices were obtained on a Metricon refractometer (2010/M) and were tested at 632 nm. The IR thermal images were recorded via an infrared camera (ICI 9320P). The digital photographs of TPCC at different temperatures were taken in an oven with a thermocouple connected to the TPCC to read the temperature. Temperature-dependent XRD analysis were measured from 25 to 45° C. at a heating/cooling rate of 10° C. $min^{-1}$ using a Rigaku SmartLab diffractometer with CuKα (1.5418 Å) radiation. The average crystal size from XRD results was calculated by Equation 1:

$$D = \frac{0.94 \times \lambda}{\beta \times \cos\theta} \quad (1)$$

where D is the average crystal size, λ is X-ray wavelength, β is line broadening in radius and θ is Bragg angle. The UV lamp used for the stability test of TPCC under UV exposure is UVP Blak-Ray™ B-100AP High-Intensity UV Inspection Lamps. Transmittance spectra of the samples were measured using an UV-Vis-NIR spectrophotometer with tungsten halogen and deuterium lamps. (Shimadzu UC-3101PC)

The optical modulation ability of the TPCC film is characterized by the integral transmittance in the solar, luminous and infrared wavelength ranges. $T_{solar}$ (300-2500 nm), $T_{lum}$ (390-780 nm), and $T_{IR}$ (780-2500 nm), are shown as follows:

$$T_{solar}, T_{lum}, T_{IR} = \frac{\int \varphi(\lambda)T(\lambda)d\lambda}{\int \varphi(\lambda)d\lambda} \quad (2)$$

$$\Delta T_{solar}, T_{lum}, T_{IR} = T_{solar}, T_{lum}, T_{IR}(\text{transprent state}) - T_{solar}, T_{lum}, T_{IR}(\text{opaque state}) \quad (3)$$

T(λ) denotes the recorded transmittance at a particular wavelength, For $T_{solar/IR}$, ψ(λ) is the solar irradiance spectrum for air mass 1.5; and for $T_{lum}$,ψ(λ) is the CIE "physiologically-relevant" luminous efficiency function.

The solar energy shielding test was conducted on a model styrofoam chamber with a dimension of 8×6.5×5 $inch^3$ with wall thickness of 1 inch. The 2×3 $inch^2$ window devices made by double-glass slides or the TPCC device were assembled on the model chamber. A standard solar simulator (100 mW $cm^{-2}$, Oriel Sol3A, Newport) was calibrated to air mass 1.5 on the top side of the window. Pico TC-08 USB Thermocouple Data Logger with PicoLog Data Logging Software for temperature measurement was employed to collect data.

Second Example

Figure 5:
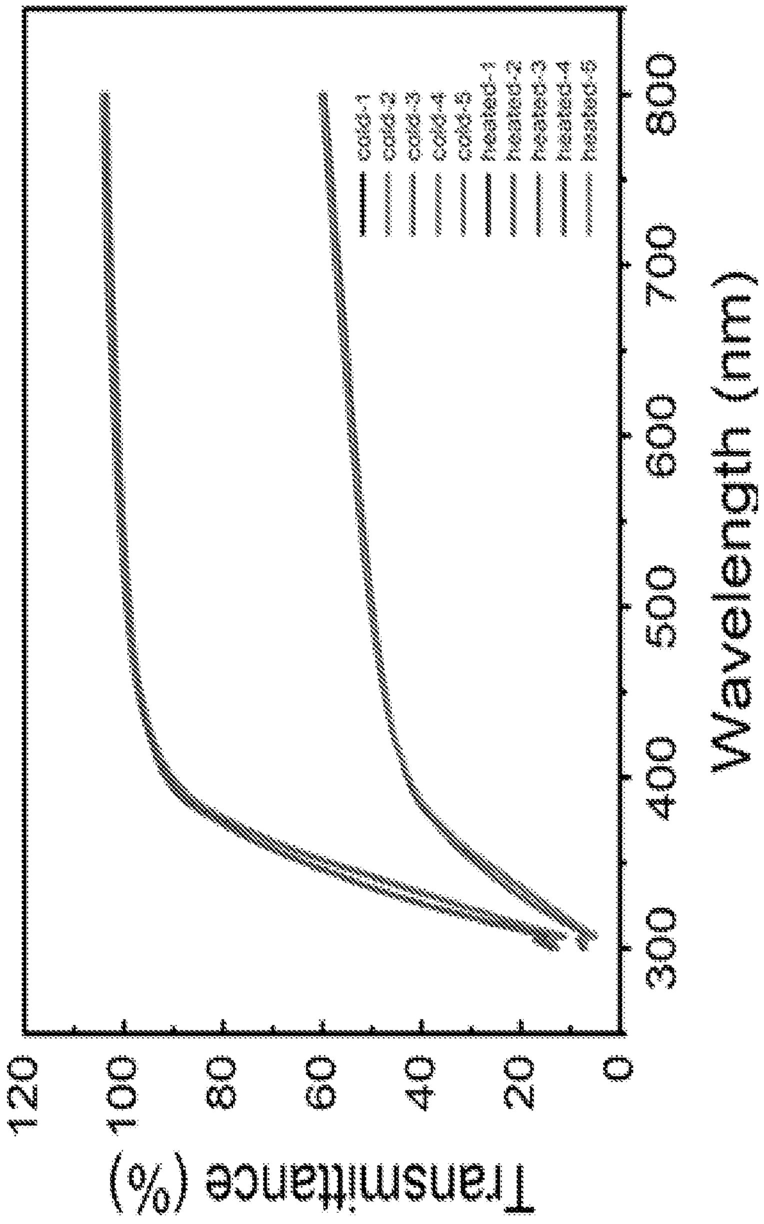
FIG. 5. Transmittance spectrum of a polymer film with HEA:SA weight ratio of 6:1 film, sandwiched between two glass slides, measured repeatedly at room temperature and 65° C. for 5 cycles. Note that all the cold states overlap (upper charts), while all the hot states overlap (lower charts).

Hydroxyethyl acrylate (HEA) and stearyl acrylate (SA) were mixed at different ratios. Trimethylolpropane triacrylate (TMPTMA, a crosslinker) and 2,2-dimethoxy-2-phenylacetophenone (DMPA, a photoinitiator) were at added at approximately 1 wt % each of the total weight. The mixture was heated at 65° C. and stirred to render a clear solution. The solution was injected while hot between two glass slides (separated with spacers of 170 μm thickness), and then cured under UV light for 3 minutes. The resulting film sandwich was heated to 65° C. and then cooled to room temperature. The heating and cooling were repeated for 5 cycles, and the transmittance of the film is shown in FIG. 5.

The HEA:SA weight ratio was varied from 1:2 to 6:1. All films showed high transparency at the unheated state and high opacity at the heated state.

Third Example

Figure 6:
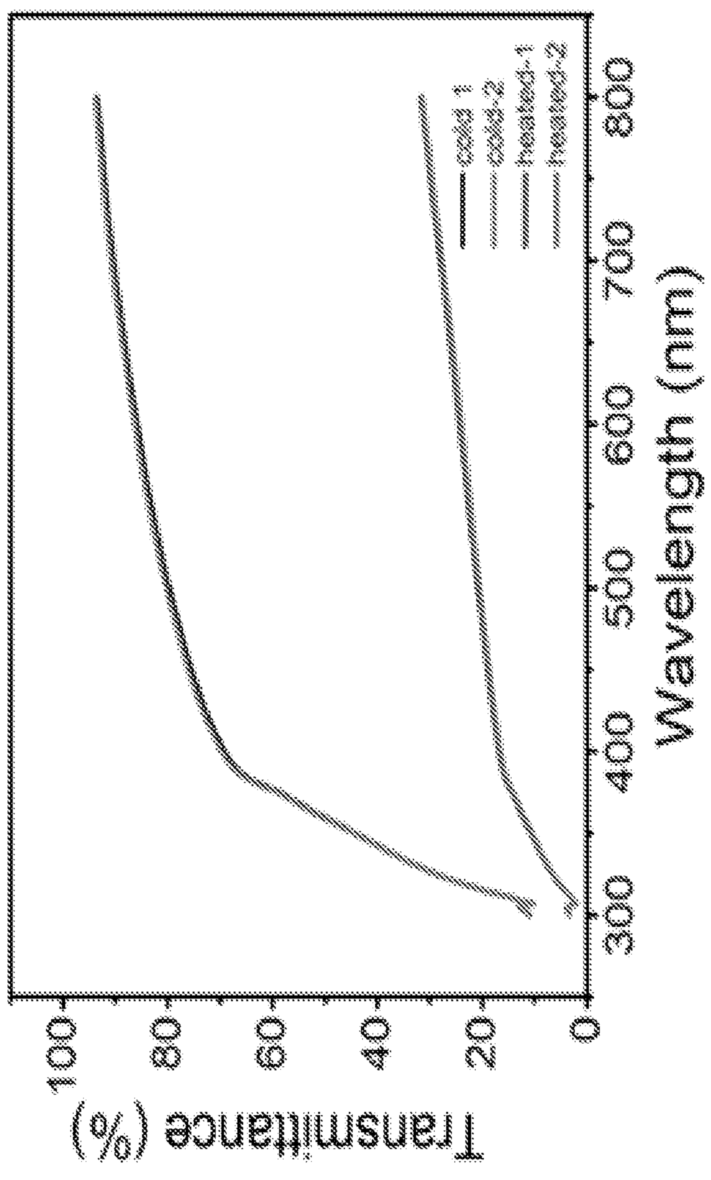
FIG. 6. Transmittance spectrum of the polymer film containing HEA:SA:2-butanone at the ratio of 1.7 gram: 0.28 gram 0.25 mL during the film preparation. Some or all of the 2-butanone has evaporated away. The film is sandwiched between two glass slides. The transmittance was measured at room temperature and 65° C. for 2 cycles. Note that the cold states overlap (upper charts), while the hot states overlap (lower charts).

Hydroxyethyl acrylate (HEA, 1.7 grams), stearyl acrylate (SA, 0.28 grams), and 2-butanone (0.25 mL) were mixed, heated and stirred to obtain a clear solution. Trimethylolpropane triacrylate (TMPTMA, a crosslinker) and 2,2-dimethoxy-2-phenylacetophenone (DMPA, a photoinitiator) were at added at approximately 1 wt % each of the total weight. The solution was injected while hot between two glass slides (separated with spacers of 170 μm thickness), and then cured under UV light for 3 minutes. The resulting film sandwich was heated to 65° C. and then cooled to room temperature. The heating and cooling were repeated for 2 cycles, and the transmittance of the film is shown in FIG. 6.

Fourth Example

Figure 7:
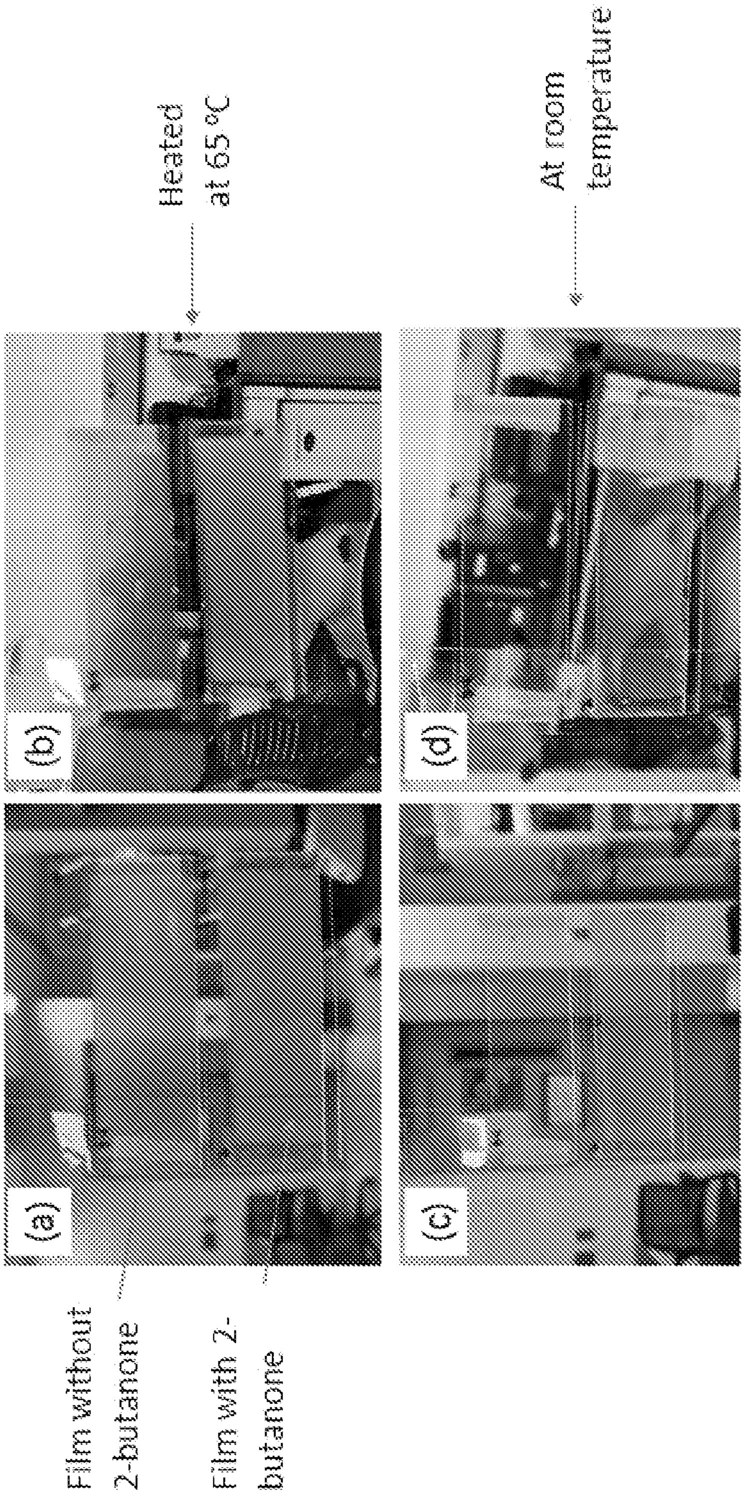
FIG. 7. Optical photographs of the thermochromic polymer films. In all images, upper sample is the film without 2-butanone and lower sample is with 2-butanone. (a) films heated at 65° C., (b) same as (a) when shot from a different angle. (c) films at room temperature. (d) same as (c) shot from a different angle.

Hydroxyethyl acrylate (HEA, 1.7 grams) and hexadecyl acrylate acrylate (HDA, 0.28 grams) were mixed, heated and stirred to obtain a clear solution. Trimethylolpropane triacrylate and 2,2-dimethoxy-2-phenylacetophenone were at added at approximately 1 wt % each of the total weight. The solution was injected while hot between two glass slides (separated with spacers of 170 μm thickness), and then cured under UV light for 3 minutes. The resulting film sandwich was heated to 55° C. and then cooled to room temperature. The heating and cooling were repeated for 2 cycles, and the transmittance of the film is shown in FIG. 7.

Figure 8:
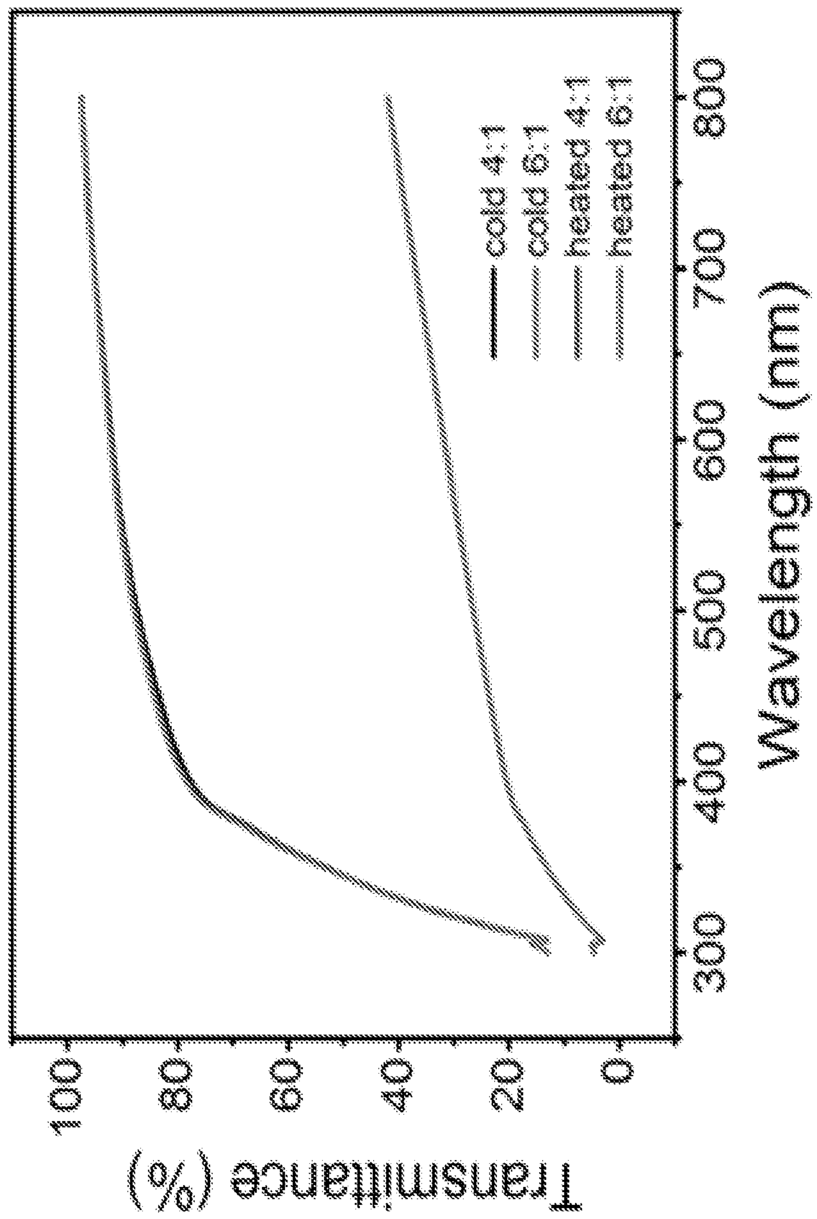
FIG. 8. Transmittance spectrum of HEA:HDA with weight ratio of 6:1 and 4:1 film at room temperature (upper charts) and 55° C. (lower charts).
Figure 9:
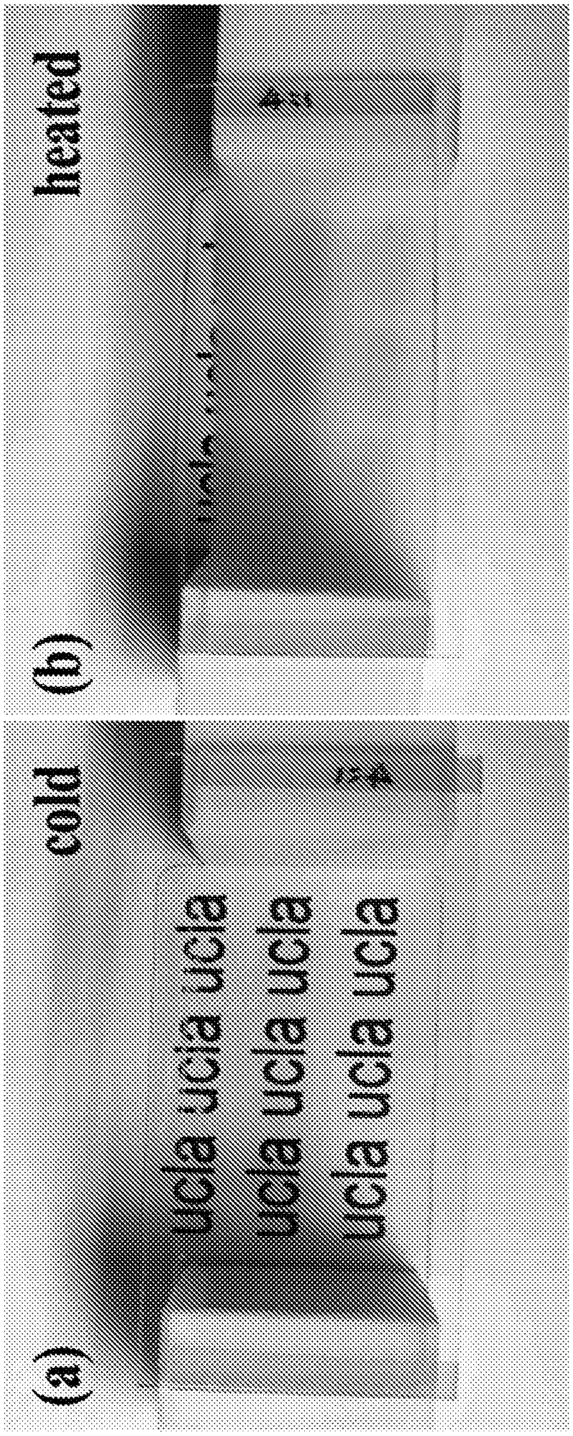
FIG. 9. Optical photographs of a thermochromic film comprising HEA:HDA weight ratio of 4:1. (a) at room temperature (the printed letters placed beneath the film are visible), (b) at 55° C.

A copolymer film with HEA:HDA weight ratio of 4:1 was similarly prepared. It showed similarly high transparency at the unheated state and high opacity at the heated state (see FIG. 8)

Fifth Example

Figure 10:
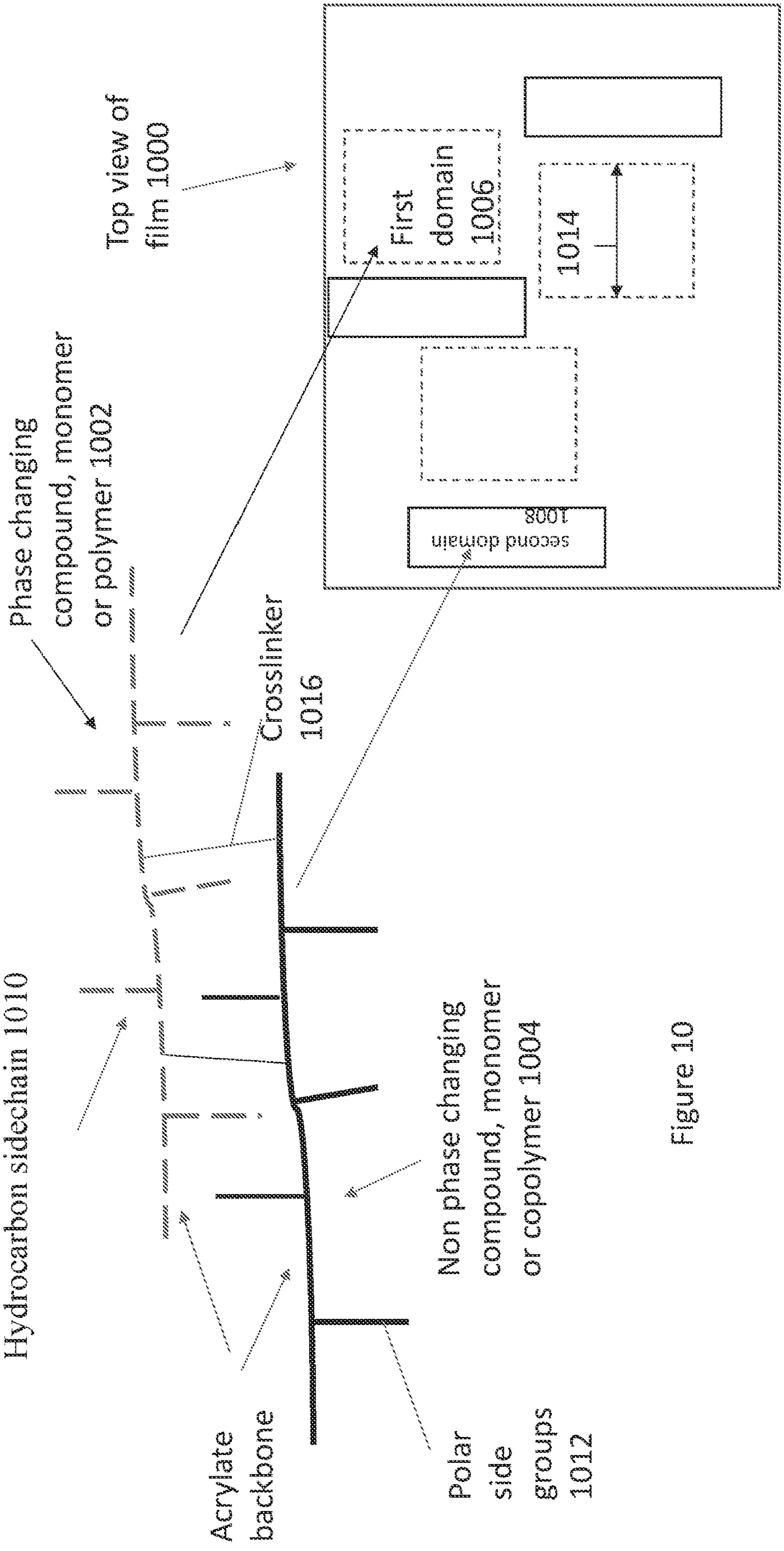
FIG. 10. Schematic of a solid polymer film useful in a smart window according to one or more examples.

FIG. 10 illustrates a polymer film 1000 comprising two phase separated co-monomers or phase separated polymers 1002, 1004 forming phase-separated domains or phase 1006, 1008 in a resulting crosslinked copolymer. At ambient temperatures, the phase changing domain 1006 has a first refractive index matched with (e.g., within 0.5% of) a second refractive index of the non phase changing domain 1008. The copolymer film is thus transparent. Above the phase changing threshold temperature, the phase changing domain experiences a large reduction of refractive index so that the copolymer film 1000 becomes opaque (first refractive index is at least 0.6% lower than the second refractive index. The first domain comprises more phase-changing hydrocarbon side chains 1010, while a majority of the second domain comprises the non phase changing polymer 1004 which may in some examples include polar groups 1012. In one or more examples, the domains or grains 1006, 1008 have a largest dimension 1014 (e.g., diameter, length, or width) larger than 1 micrometer (optical scattering becomes significant if at least one dimension is >1 um). Also shown are crosslinker compounds 1016 crosslinking the polymers.

Process Steps

Figure 11:
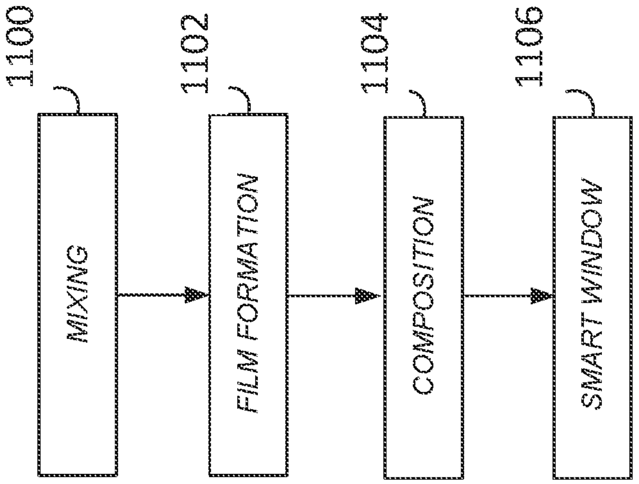
FIG. 11. Flowchart illustrating a method of making a composition of matter.

FIG. 11 is a flowchart illustrating a method of making a composition of matter useful as a thermochromic polymer film in a smart window.

Block 1100 represents combining (e.g., mixing) a first composition comprising one or more first polymers and/or one or more first co-monomers and/or one or more first monomers with a second composition comprising one or more second polymers, one or more second co-monomers, or one or more second co-monomers so as to form a mixture. In one or more examples, the weight percentage of the first composition and the second composition are each greater than 10 wt % of the total weight of the mixture. Other compounds may also be mixed together, such as a volatile solvent that dissolves one or more of the other compositions, a polymerization initiator, a colorant, a UV stabilizer, a flame retardant additive, and/or an adhesion promotion agent. The mixture may be treated using one or more heating, stirring, or sonication steps, to form a uniform liquid mixture.

Block 1102 represents film formation comprising processing of the liquid mixture into a thin film comprising two separated solid phases, comprising a first phase and a second phase. The processing may involve one or more of the techniques including coating, printing, lamination, and injection between two sheets, evaporation of volatile components, UV light exposure, visible light exposure, infrared light exposure, heating, heating and cooling treatment, and vacuum treatment. In one or more examples, at least 50% of the first phase comprises the one or more first polymers and/or one or more first co-monomers and/or one or more first monomers, and at least 50% of the second phase comprises the one or more second polymers, the one or more second co-monomers, or the one or more second co-monomers. In one or more examples the second polymers are cross-linked with the first polymers. In one or more examples the heating is to a temperature between 50 and 100 degrees and the cooling is to a temperature of less than 30 degrees. In one or more examples, the two separated phases comprise a blend.

Block 1104 represents the composition of matter.

The composition of matter can be embodied in many ways including, but not limited to, the following.

1. A solid state thermochromic polymer film 1000, 100 comprising two or more separated solid phases (e.g., a first phase 104 comprising first domains 1006 and a second phase 102 comprising second domains 1008), wherein the separated solid phases 102, 104 are transparent and comprise at least one phase 104 (or one or more phases) which undergoes a crystal melting. The at least one phase 104 which undergoes the crystal melting has a reduced refractive index above a threshold temperature, becomes opaque when the temperature of the at least one phase rises above the threshold temperature, and reverts to being transparent when the temperature lowers to an ambient temperature below said threshold temperature.

2. The solid state thermochromic polymer film of example 1, wherein the film:
- is transparent at the ambient temperature with a transmittance greater than 70% (e.g., 70%≤Transmittance≤100%) for one or more wavelengths λ or all the wavelengths λ wherein 400 nanometers≤λ≤1400 nanometers;
- becomes opaque at a temperature above the threshold temperature with the transmittance less than 50% (e.g., 0%≤Transmittance≤50%) for the one or more wavelengths λ or all the wavelengths λ wherein 400 nanometers≤λ≤1400 nanometers; and
- has the threshold temperature comprising an opacity transition temperature that is greater than 28° C. and less than 130° C.

3. The solid state thermochromic polymer film of example 2, wherein the opacity transition temperature is greater than 28° C. and less than 50° C.

4. The solid state thermochromic polymer film of any of the examples 1-3, wherein:
- the crystal melting induces a refractive index reduction by at least 0.01, and
- the refractive index reduction is reversed when the temperature of the solid polymer film is lowered to the ambient temperature.

5. The solid state thermochromic polymer film of any of the examples 1-4, wherein:
- the refractive index reduction is greater than 0.01 over a temperature range of +/−3° C. with respect to the threshold temperature.

6. The solid state thermochromic polymer film of any of the examples 1-5, wherein the one of the phases (first phase 104) undergoing the crystal melting comprises a crystal melting moiety comprising:
- at least one first compound 1002 selected from the group consisting of or comprising hydrocarbon groups including dodecyl, tetradecyl, hexadecyl, and octadecyl; and
- polymer chain segments 1002 selected from the group consisting or comprising of polyacrylate, polymethacrylate, polycarbonate, polyamide, polyurethane, polysiloxane, poly(olefin oxide), poly(olefin glycol), and their copolymers; and wherein the first compound is attached as a side chain 1010 on the polymer chain segments.

6b. The solid state thermochromic polymer film of any of the examples 1-5, wherein the at least one phase 104 undergoing the crystal melting comprises:

polymer chain segments 1002 comprising at least one of a polyacrylate, a polymethacrylate, a polycarbonate, a polyamide, a polyurethane, a polysiloxane, a poly (olefin oxide), poly(olefin glycol), or a copolymer thereof; and one or more side chains 1010 attached to the polymer chain segments, the side chains comprising at least one of a dodecyl, a tetradecyl, a hexadecyl, or an octadecyl.

7. The solid state thermochromic polymer film of example 6 or 6b wherein the polymer chain segments can be selected from the group comprising ethoxylated acrylate, ethoxylated trimethylolpropane triacrylate, poly(ethylene glycol) diacrylate, ethoxylated methacrylate, ethoxylated trimethylolpropane trimethacrylate, or poly(ethylene glycol) dimethacrylate.

7b. The solid state thermochromic polymer film of example 6 or 6b, wherein the polymer chain segments 1002 comprise at least one of an ethoxylated acrylate, an ethoxylated trimethylolpropane triacrylate, a poly(ethylene glycol) diacrylate, an ethoxylated methacrylate, an ethoxylated trimethylolpropane trimethacrylate, a poly(ethylene glycol) dimethacrylate, a propoxylated acrylate, a propoxylated diacrylate, a propoxylated trimethylolpropane triacrylate, a propoxylated methacrylate, a propoxylated dimethacrylate, or a propoxylated trimethylolpropane trimethacrylate.

8 The solid state thermochromic polymer film of any of the examples 1-7b, wherein at least one of the separated solid phases (second phase 102) does not undergo phase change around the threshold temperature.

9. The solid state thermochromic polymer film of example 8, wherein the one of the solid phases (second phase 102) which does not undergo phase changing around the threshold temperature comprises at least one first compound 1004 selected from the group consisting or comprising of hydroxyl, cyano, carboxylic acid, amine, alkylamine, amide, ketone, ether.

9b. The solid state thermochromic polymer film of example 8, wherein the at least one of the separated solid phases 102 which does not undergo the phase change around the threshold temperature comprises one or more first compounds 1004 comprising at least one of a hydroxyl, a cyano, a carboxylic acid, an amine, an alkylamine, an amide, a ketone, or an ether.

10. The solid state thermochromic polymer film of any of the examples 1-9b prepared by copolymerization of a mixture containing at least hexadecyl acrylate and 2-hydroxyethyl acrylate.

11. The solid state thermochromic polymer film of any of the examples 1-9b prepared by copolymerization of a mixture containing at least hexadecyl methacrylate and 2-hydroxyethyl methacrylate.

12. The solid state thermochromic polymer film of any of examples 10 and/or 11, wherein the mixture further comprises a multifunctional monomer selected from the group consisting of diacrylate, dimethacrylate, triacrylate, trimethacrylate, oligoacrylate, and oligomethacrylate.

12b. The solid state thermochromic polymer film of any of examples 10 and/or 11, wherein the mixture further comprises one or more multifunctional monomers comprising at least one of a diacrylate, a dimethacrylate, a triacrylate, a trimethacrylate, an oligoacrylate, or an oligomethacrylate.

13. The solid state thermochromic polymer film any of the examples 10-12b, wherein the copolymerization is by a means of ultraviolet (UV) exposure or heating.

14 The solid state thermochromic polymer film of any of the examples 1-13, comprising a first polymer 1002 interspersed with a second polymer 1004;

the first polymer 1002 is the primary or majority component of the one phase undergoing the crystal melting (e.g., the first polymer comprises more than 50% by weight of the one phase undergoing the crystal melting);

the second polymer 1004 is the primary or majority component of another of the phases not undergoing the phase transition around the threshold temperature (e.g., the second polymer 1004 comprises more than 50% by weight of the one phase undergoing the crystal melting);

the first polymer and the second polymer have matched refractive indices before the phase change of the first polymer resulting in the crystal melting; and the first polymer phase changes from a crystalline state to an amorphous state upon heating from a temperature below its melting point to a temperature above its melting point.

15. The solid state thermochromic polymer film of example 14 wherein the first polymer comprises hydrocarbon groups selected from the group including dodecyl, tetradecyl, hexadecyl, and octadecyl.

15b. The solid state thermochromic polymer film of example 14 wherein the first polymer 1002 comprises one or more hydrocarbon groups 1010 comprising at least one of a dodecyl, a tetradecyl, a hexadecyl, or a octadecyl.

16. The solid state thermochromic polymer film of any of the examples 14-15b wherein the second polymer comprises polar groups selected from the group consisting or comprising of hydroxyl, cyano, carboxylic acid, amine, alkylamine, amide, ketone, and ether.

16b. The solid state thermochromic polymer film of any of the examples 14-15b wherein the second polymer comprises one or more polar groups 1012 comprising at least one of a hydroxyl, a cyano, a carboxylic acid, an amine, an alkylamine, an amide, a ketone, or an ether.

17. The solid state thermochromic polymer film of any of the examples 14-16b wherein the first polymer 1002 is blended with the second polymer 1004.

18. The solid state thermochromic polymer film of any of the examples 14-17 wherein the solid state thermochromic polymer film 1000 is prepared by partially reacting said first polymer with second polymer.

19. The solid state thermochromic polymer film of any of the examples 1-18, wherein at least two of the separated phases comprise phase grains 1006, 1008 having a largest dimension 1014 larger than 1 micrometer.

20. The solid state thermochromic polymer film of any of the examples 1-19, wherein the two separated phases 102, 104:

a) have matching refractive indices (e.g., within 0.5% of each other) below the threshold temperature (e.g., comprising a solid threshold temperature); and b) have refractive indices with large difference (e.g., more than 0.6% different from each other) above the threshold temperature (e.g., comprising the solid polymer film's transition temperature).

21. The solid state thermochromic polymer film of any of the examples 1-20, having the transmittance of at least 70% (e.g., 70%≤Transmittance≤100%), for one or more wavelengths λ or all the wavelengths λ wherein 400 nanometers SAS 1400 nanometers, below the threshold temperature due to the matching refractive indices of the two different phases and a lower transmittance of no more than 50%, e.g., 0%≤Transmittance≤50%, (for one or more wavelengths λ or all the wavelengths λ wherein 400 nanometers≤λ≤1400 nanometers) above the transition temperature due to the mismatching refractive indices of the two different phases.

22. The solid state thermochromic polymer film of any of the examples 1-21, wherein a thickness T of the solid state thermochromic polymer film 1000 is 1 micrometer≤T≤1 millimeter.

23. The solid state thermochromic polymer film of any of the examples 1-21, wherein a thickness T of the solid polymer film is 10 micrometers≤T≤500 micrometers.

Block 1106 represents including the polymer film or composition of matter in a smart window. In one or more examples, the composition of matter or film is combined with a transparent heater. The smart window can be embodied in many ways including, but not limited to, the following.

24. A smart window comprising:
- a solid state thermochromic polymer film of any of the preceding examples 1-23; and
- a transparent heater comprising a transparent conductive layer in thermal contact with the solid state thermochromic polymer film so as to heat the solid state thermochromic polymer film when desired. In one or more examples, the transparent conductive layer has a transmittance of at least 70% (e.g., 70%≤Transmittance≤100%) for one or more wavelengths 2 or all the wavelengths λ wherein 400 nanometers≤λ≤1400 nanometers.

25. The smart window of example 24, wherein the transparent conductive layer comprises a transparent conductive material including at least one of a metal coating, one or more metal nanowires, a metal grid, one or more carbon nanotubes, graphene, or indium tin oxide.

26. The smart window of any of the examples 24 and/or 25, wherein the smart window:
- a) comprises a thin sheet or is conformed on or is conformed to a flat or curved surface,
- b) is transparent or comprises the solid state thermochromic polymer film that is transparent at the ambient temperature,
- c) is electrically controlled so that the solid state thermochromic polymer film becomes opaque when heated above a transition temperature using the transparent heater,
- d) has the opacity maintained with continuous heating by the transparent heater, and
- e) has the opacity reversed or reduced when the transparent heater is switched off.

27. The solid state thermochromic polymer film of any of the examples 1-26, wherein the polymers in the polymer film 1000 have a refractive index in a range of 1.3-1.8 or in a range of 1.4-1.6.

28. The solid state thermochromic polymer film 1000 of any of the examples 1-27, wherein:
- below the threshold temperature, the first phase 104 undergoing the crystal melting has a first refractive index n1, the second phase 102 not undergoing the crystal melting has a second refractive index n2 and $|n1-n2| \leq (0.5/100) \times n1$, where $|n1-n2|$ is the absolute value or magnitude of n1−n2, and
- above the threshold temperature, n1 is reduced by more than 0.6% as compared to the n1 above the threshold temperature, such that $n1_{below}-n1_{above} \geq (0.6/100) \times n1_{below}$ and $|n1-n2| \geq (0.6/100) \times n1$, where $n1_{above}$ is the first refractive index of the first phase above the threshold temperature and $n1_{below}$ is the first refractive index below the threshold temperature.

29. The solid state thermochromic polymer film of any of the examples 1-28, wherein the transparency of at least one of the thermochromic film or the phase undergoing the crystal melting, at the temperature below the threshold temperature, is sufficient for use as an external window on a building, house, or vehicle and the opacity at the temperature above the threshold temperature is such that the transparency is reduced by at least 20%.

30. The solid state thermochromic polymer film of any of the examples 1-29, wherein the separated phases comprise a crosslinked polymers or crosslinked co-monomers.

31. The solid state thermochromic film of any of the examples 1-29, wherein the at least one phase undergoing the crystal melting comprises a first polymer or first co-monomer and another of the separated solid phases comprises a second polymer or second co-monomer, wherein the first polymer is crosslinked to the second polymer and the first polymer or first co-monomer comprises larger side chains comprising a phase changing hydrocarbon as compared to the second polymer or second co-monomer.

32. The solid state thermochromic film of example 31 wherein the at least one phase undergoing the crystal melting comprises a crystalline phase and the other of the separated solid phases is amorphous.

33. The solid state thermochromic film of example 31 or 32 wherein the another of the separated solid phases does not undergo the crystal melting.

Advantages and Improvements

The global issues of climate change and the rapidly escalating energy consumption have inspired developments in the efficiency of energy usage. Utilizing smart windows' tunable opacity to control both the timing and amount of light transmission would have a direct reduction in the overall demand for air conditioning and heating. Smart windows can also be deployed in business and household rooms to improve privacy protection.

Three different technologies have been developed for smart windows: photochromic, electrochromic and thermochromic technologies. Currently available photochromic, electrochromic, and thermochromic smart window materials have limited bandwidth modulation, have short lifetimes, and/or must undergo complex production methods.

Photochromic-based smart windows are based on special compounds added into a film or coating. The compounds are light sensitive and exhibit changes to their optical absorption spectrum (U.S. Pat. No. 6,446,402 B1). The opacity change is limited to a narrow optical wavelength range, which is not a desirable feature. The absorption at a certain wavelength range usually results in a fixed color for the opaque and/or transparent states, which is undesirable for general applications. The optical absorption also leads to heating of the window.

Electrochromic smart windows utilize the insertion and extraction of electrons in electrochemical redox reactions of the host materials to change colors. The switching speed depends on the active device area, diffusion length, and coefficient of electrolyte ions. The switching time of large-area electrochromic windows can take up to 10 minutes for practical usage. Electrochromic windows overall share the same problems of photochromic windows in that they have fixed colorations at either the transparent state, opaque state, or both. More critically, electrochromic windows have complicated structures, limited cycle lifetime, and excessive sealant due to the use of liquid electrolytes.

Thermochromic smart windows traditionally use VO2-based materials which change colors due to a metal-insulator transition at critical temperatures, but these materials have low transmittance at visible light range for the transparent state, low oxidation resistance, and high cost for fabrication. Hydrogel-based thermochromic smart windows take advantage of hydrogels' phase separation property to enable a wide modulation wavelength range and high transmittance modulation contrast (Li, X. H., Liu, C., Feng, S. P. and Fang, N. X., 2019. Broadband light management with thermochromic hydrogel microparticles for smart windows has been reported (see *Joule,* 3 (1), pp. 290-302). However, the inclusion of water in a hydrogel-based thermochromic smart window hinders the cyclic stability due to water evaporation. Thermochromic polymer-dispersed or polymerstabilized liquid crystals suffer from having a limited bandwidth due to their fixed pitches. Cholesteric liquid crystals or stacked liquid crystals with various pitches were used to enable large bandwidth switching, but they are expensive for large area applications in buildings.

Thermochromic smart windows based on solid state polymer films (U.S. Pat. No. 6,362,303 B1) are opaque at ambient temperature due to light scattering, and turn transparent when heated above a threshold temperature. While useful for some applications, for smart windows applications for energy savings, the opacity change is in the wrong direction: when outdoor temperature is cool, this film is opaque and reflects sun light to lower the solar heating effect in the room. When it is hot outside, the film becomes transparent and allows the sunlight to penetrate through the window and heat inside the room.

Here we introduce a new thermochromic smart window material which is transparent when it is cold and allows sunlight to warm up the room. When it becomes hot (e.g., in the middle of the summer day) the window becomes opaque to block sunlight from entering the room. It is advantageous over the hydrogel-based thermochromic smart window because hydrogen can lose water over time, and the hydraulic pressure can be too large for large window areas. Embodiments of the present thermochromic films are based on all-solid polymer film, containing no water or any other volatile compounds.

We note that solar flux ranges from UV, to visible, and infrared. Much of the solar flux heat is transmitted in the visible and near infrared wavelength range. The present thermochromic polymer film changes its opacity in a broad wavelength range, covering most of the solar flux wavelength range.

REFERENCES

The following references are incorporated by reference herein

1. Liu, J. C.; Liao, W. Q.; Li, P. F.; Tang, Y. Y.; Chen, X. G.; Song, X. J.; Zhang, H. Y.; Zhang, Y.; You, Y. M.; Xiong, R. G., A molecular thermochromic ferroelectric. *Angew. Chem.* 2020. 132 (9), 3523-3527.
2. Hao, Q.; Li, W.; Xu, H.; Wang, J.; Yin, Y.; Wang, H.; Ma, L.; Ma, F.; Jiang, X.; Schmidt, O. G., $VO_2$/TIN plasmonic thermochromic smart coatings for room-temperature applications. *Adv. Mater.* 2018, 30 (10), 1705421.
3. Wang, Y.; Cao, X.; Cheng, J.; Yao, B.; Zhao, Y., Wu, S.; Ju, B.; Zhang, S.; He, X.; Niu, W., Cephalopod-Inspired Chromotropic Ionic Skin with Rapid Visual Sensing Capabilities to Multiple Stimuli. *ACS nano* 2021, 15 (2), 3509-3521.
4. Kuroiwa, H.; Inagaki, Y.; Mutoh, K.; Abe, J., On-Demand Control of the Photochromic Properties of Naphthopyrans. *Adv. Mater.* 2019, 31 (2), 1805661.
5. Wang, W.; Fan, X.; Li, F.; Qiu, J.; Umair, M. M.; Ren, W.; Ju, B.; Zhang, S.; Tang, B., Magnetochromic photonic hydrogel for an alternating magnetic field-responsive color display. *Adv. Opt. Mater.* 2018, 6 (4), 1701093.
6. Gu, H.; Guo, C.; Zhang, S.; Bi, L.; Li, T.; Sun, T.; Liu, S., Highly efficient, near-infrared and visible light modulated electrochromic devices based on polyoxometalates and $W_{18}O_{49}$ nanowires. *ACS nano* 2018, 12 (1), 559-567.
7. Li, P.; Sui, Q., Guo, M.-Y.; Yang, S.-L., Bu, R.; Gao, E.-Q., Selective chemochromic and chemically-induced photochromic response of a metal-organic framework. *Chem Commun.* 2020, 56 (44), 5929-5932.
8. Kim, H. N.; Yang, S., Responsive smart windows from nanoparticle-polymer composites. *Adv. Funct. Mater.* 2020, 30 (2), 1902597.
9. Jurewicz, I; King, A. A.; Shanker, R.; Large, M. J.; Smith, R. J.; Maspero, R.; Ogilvie, S. P.; Scheerder, J.; Han, J.; Backes, C., Mechanochromic and Thermochromic Sensors Based on Graphene Infused Polymer Opals. *Adv. Funct. Mater.* 2020, 30 (31), 2002473.
10. Wang, Q; Yu, L.; Sun, J.; Guan, Y.; Zhou, Z.; Shin, Y.; Yang, H.; West, J.; Yang, D. K., Sunlight-Driven Self-Organized Helical Superstructure Chromotropic Device. *Adv. Opt. Mater.* 2020, 8 (24), 2001207.
11. Ke, Y.; Zhou, C.; Zhou, Y.; Wang, S.; Chan, S. H., Long, Y., Emerging thermal-responsive materials and integrated techniques targeting the energy-efficient smart window application. *Adv. Funct. Mater.* 2018, 28 (22), 1800113.
12. Cui, Y.; Ke, Y.; Liu, C.; Chen, Z., Wang, N.; Zhang, L.; Zhou, Y.; Wang, S.; Gao, Y.; Long, Y., Thermochromic $VO_2$ for energy-efficient smart windows. *Joule* 2018, 2 (9), 1707-1746.
13. Ke, Y.; Balin, I.; Wang, N.; Lu, Q.; Tok, A. I. Y.; White, T. J.; Magdassi, S.; Abdulhalim, I.; Long, Y., Two-dimensional $SiO_2/VO_2$ photonic crystals with statically visible and dynamically infrared modulated for smart window deployment. *ACS Appl. Mater. Interfaces* 2016, 8 (48), 33112-33120.
14. Zhu, J.; Huang, A.; Ma, H.; Chen, Y.; Zhang, S.; Ji, S.; Bao, S.; Jin, P., Hybrid films of $VO_2$ nanoparticles and a nickel (ii)-based ligand exchange thermochromic system: excellent optical performance with a temperature responsive colour change. *New J. Chem.* 2017, 41 (2), 830-835.
15. Zhu, J.; Zhou, Y.; Wang, B.; Zheng, J.; Ji, S.; Yao, H.; Luo, H.; Jin, P., Vanadium dioxide nanoparticle-based thermochromic smart coating: high luminous transmittance, excellent solar regulation efficiency, and near room temperature phase transition. *ACS Appl. Mater. Interfaces* 2015, 7 (50), 27796-27803.
16. Zheng, J.; Bao, S.; Jin, P., $TiO_2$ (R)/$VO_2$ (M)/$TiO_2$ (A) multilayer film as smart window: Combination of energy-saving, antifogging and self-cleaning functions. *Nano Energy* 2015, 11, 136-145.
17. Zhu, J.; Huang, A.; Ma, H.; Ma, Y.; Tong, K.; Ji, S.; Bao, S.; Cao, X.; Jin, P., Composite film of vanadium dioxide nanoparticles and ionic liquid-nickel-chlorine complexes with excellent visible thermochromic performance. *ACS Appl. Mater. Interfaces* 2016, 8 (43), 29742-29748.
18. Zhang, Y.; Tso, C.; Iñigo, J. S.; Liu, S.; Miyazaki, H.; Chao, C. Y.; Yu, K. M., Perovskite thermochromic smart window: Advanced optical properties and low transition temperature. *Appl. Energy* 2019, 254, 113690.

19. Liang, X.; Chen, M.; Guo, S.; Zhang, L.; Li, F.; Yang, H., Dual-band modulation of visible and near-infrared light transmittance in an all-solution-processed hybrid micro-nano composite film. *ACS Appl. Mater. Interfaces* 2017, 9 (46), 40810-40819.
20. Liang, X.; Chen, M.; Wang, Q.; Guo, S.; Zhang, L.; Yang, H., Active and passive modulation of solar light transmittance in a hybrid thermochromic soft-matter system for energy-saving smart window applications. *J. Mater. Chem. C* 2018, 6 (26), 7054-7062.
21. Liang, X.; Guo, S.; Chen, M.; Li, C.; Wang, Q.; Zou, C.; Zhang, C.; Zhang, L.; Guo, S.; Yang, H., A temperature and electric field-responsive flexible smart film with full broadband optical modulation. *Mater. Horiz.* 2017, 4 (5), 878-884.
22. Li, X.-H.; Liu, C.; Feng, S.-P.; Fang, N. X., Broadband light management with thermochromic hydrogel microparticles for smart windows. *Joule* 2019, 3 (1), 290-302.
23. Zhou, Y.; Layani, M.; Wang, S.; Hu, P.; Ke, Y.; Magdassi, S.; Long, Y., Fully printed flexible smart hybrid hydrogels. *Adv. Funct. Mater.* 2018, 28 (9), 1705365.
24. Zhou, Y.; Wang, S.; Peng, J.; Tan, Y.; Li, C.; Boey, F. Y. C.; Long, Y., Liquid Thermo-Responsive Smart Window Derived from Hydrogel. *Joule* 2020, 4 (11), 2458-2474.
25. Coates, D., Polymer-dispersed liquid crystals. *J. Mater. Chem.* 1995, 5 (12), 2063-2072.
26. Zhang, Q.; Jiang, Y.; Chen, L.; Chen, W., Li, J.; Cai, Y.; Ma, C., Xu, W.; Lu, Y.; Jia, X., Ultra-Compliant and Tough Thermochromic Polymer for Self-Regulated Smart Windows. *Adv. Funct. Mater.* 2021, 2100686.
27. Liu, J.; Detrembleur, C.; Grignard, B.; De Pauw-Gillet, M. C.; Mornet, S.; Treguer-Delapierre, M.; Petit, Y.; Jérôme, C.; Duguet, E., Gold Nanorods with Phase-Changing Polymer Corona for Remotely Near-Infrared-Triggered Drug Release. *Chem. Asian J.* 2014, 9 (1), 275-288.
28. Ren, Z.; Hu, W.; Liu, C.; Li, S.; Niu, X.; Pei, Q., Phase-changing bistable electroactive polymer exhibiting sharp rigid-to-rubbery transition. *Macromolecules* 2016, 49 (1), 134-140.
29. Peng, S.; Fuchs, A.; Wirtz, R., Polymeric phase change composites for thermal energy storage. *J. Appl. Polym. Sci.* 2004, 93 (3), 1240-1251.
30. Xie, Y.; Guan, F.; Li, Z.; Meng, Y.; Cheng, J.; Li, L.; Pei, Q., A Phase-Changing Polymer Film for Broadband Smart Window Applications. *Macromol. Rapid Commun.* 2020, 41 (16), 2000290.
31. Nosonovsky, M.; Hejazi, V.; Nyong, A. E.; Rohatgi, P. K., Metal matrix composites for sustainable lotus-effect surfaces. *Langmuir* 2011, 27 (23), 14419-14424.
32. Cao, R., Wang, Y.; Chen, S.; Han, N.; Liu, H.; Zhang, X., Multiresponsive shape-stabilized hexadecyl acrylate-grafted graphene as a phase change material with enhanced thermal and electrical conductivities. *ACS Appl. Mater. Interfaces* 2019, 11 (9), 8982-8991.
33. Hirabayashi, T.; Kikuta, T., Kasabou, K.; Yokota, K., Main-chain flexibility and side-chain crystallization of widely spaced comb-like polymers. *Polym. J.* 1988, 20 (8), 693-698.
34. Zhang, L.; Xia, F.; Yao, J.; Zhu, T.; Xia, H.; Yang, G.; Liu, B.; Gao, Y., Facile synthesis, formation mechanism and thermochromic properties of W-doped VO 2 (M) nanoparticles for smart window applications. *J. Mater. Chem. C* 2020, 8 (38), 13396-13404.
35. Shen, N.; Chen, S.; Chen, Z.; Liu, X.; Cao, C., Dong, B.; Luo, H.; Liu, J.; Gao, Y., The synthesis and performance of Zr-doped and W-Zr-codoped $VO_2$ nanoparticles and derived flexible foils. *J. Mater. Chem.* A 2014, 2 (36), 15087-15093.
36. Zhu, J.; Huang, A.; Ma, H.; Bao, S.; Ji, S.; Jin, P., Solar-thermochromism of a hybrid film of $VO_2$ nanoparticles and Co II-Br-TMP complexes. *RSC Adv.* 2016, 6 (71), 67396-67399.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A solid state thermochromic polymer film comprising: two or more separated solid phases, wherein:

the separated solid phases are transparent and comprise at least one phase which:

undergoes a crystal melting and has a reduced refractive index above a threshold temperature;

the film becomes opaque when its temperature rises above said threshold temperature; and the film reverts to being transparent when its temperature lowers to an ambient temperature below said threshold temperature.

2. The solid state thermochromic polymer film of claim 1, wherein the film:

is transparent at the ambient temperature with a transmittance greater than 70% for one or more wavelengths λ or all the wavelengths λ wherein 400 nanometers≤λ≤1400 nanometers;

becomes opaque at a temperature above the threshold temperature with the transmittance less than 50% for the one or more wavelengths λ or all the wavelengths 2 wherein 400 nanometers≤λ≤1400 nanometers; and has the threshold temperature comprising an opacity transition temperature that is greater than 28° C. and less than 130° C.

3. The solid state thermochromic polymer film of claim 2, wherein the opacity transition temperature is greater than 28° C. and less than 50° C.

4. The solid state thermochromic polymer film of claim 1, wherein:

the crystal melting induces a refractive index reduction by at least 0.01, and the refractive index reduction is reversed when the temperature of the solid state thermochromic polymer film is lowered to the ambient temperature.

5. The solid state thermochromic polymer film of claim 4, wherein:

the refractive index reduction is greater than 0.01 over a temperature range of +/−3° C. with respect to the threshold temperature.

6. The solid state thermochromic polymer film of claim 1, wherein the at least one phase undergoing the crystal melting comprises:

polymer chain segments comprising at least one of a polyacrylate, a polymethacrylate, a polycarbonate, a polyamide, a polyurethane, a polysiloxane, a poly (olefin oxide), poly(olefin glycol), or a copolymer thereof; and one or more side chains attached to the polymer chain segments, the side chains comprising at least one of a dodecyl, a tetradecyl, a hexadecyl, or an octadecyl.

7. The solid state thermochromic polymer film of claim 6, wherein the polymer chain segments comprise at least one of an ethoxylated acrylate, an ethoxylated trimethylolpropane triacrylate, a poly(ethylene glycol) diacrylate, an ethoxylated methacrylate, an ethoxylated trimethylolpropane trimethacrylate, a poly(ethylene glycol) dimethacrylate, a propoxylated acrylate, a propoxylated diacrylate, a propoxylated trimethylolpropane triacrylate, a propoxylated methacrylate, a propoxylated dimethacrylate, or a propoxylated trimethylolpropane trimethacrylate.

8. The solid state thermochromic polymer film of claim 1, wherein at least one of the separated solid phases does not undergo a phase change around the threshold temperature.

9. The solid state thermochromic polymer film of claim 8, wherein the at least one of the separated solid phases which does not undergo the phase change around the threshold temperature comprises one or more first compounds comprising at least one of a hydroxyl, a cyano, a carboxylic acid, an amine, an alkylamine, an amide, a ketone, or an ether.

10. The solid state thermochromic polymer film of claim 1 prepared by copolymerization of a mixture comprising at least hexadecyl acrylate and 2-hydroxyethyl acrylate.

11. The solid state thermochromic polymer film of claim 1 prepared by copolymerization of a mixture comprising at least hexadecyl methacrylate and 2-hydroxyethyl methacrylate.

12. The solid state thermochromic polymer film of claim 10, wherein the copolymerization is by ultraviolet (UV) exposure or heating.

13. The solid state thermochromic polymer film of claim 1, comprising a first polymer interspersed with a second polymer; wherein:

the first polymer is a majority component of the at least one phase undergoing the crystal melting;

the second polymer is a majority component of each of the one or more phases not undergoing the phase transition around the threshold temperature;

the first polymer and the second polymer have matched refractive indices before the phase change of the first polymer resulting in the crystal melting; and the first polymer phase changes from a crystalline state to an amorphous state upon heating from a temperature below a melting point of the first polymer to a temperature above the melting point.

14. The solid state thermochromic polymer film of claim 13 wherein the first polymer comprises one or more hydrocarbon groups comprising at least one of a dodecyl, a tetradecyl, a hexadecyl, or an octadecyl.

15. The solid state thermochromic polymer film of claim 13 wherein the second polymer comprises one or more polar groups comprising at least one of a hydroxyl, a cyano, a carboxylic acid, an amine, an alkylamine, an amide, a ketone, or an ether.

16. The solid state thermochromic polymer film of claim 1, wherein at least two of the separated solid phases comprise phase grains having a largest dimension larger than 1 micrometer.

17. The solid state thermochromic polymer film of claim 1, wherein the two separated solid phases:

a) have matching refractive indices within 0.5% of each other below the threshold temperature; and b) have refractive indices more than 0.6% different from each other above the threshold temperature.

18. The solid state thermochromic polymer film of claim 17, having the transmittance of at least 70% below the threshold temperature due to the matching refractive indices of the two different phases and a lower transmittance of no more than 50% above the threshold temperature due to the mismatching refractive indices of the two different phases.

19. The solid state thermochromic polymer film of claim 18, wherein a thickness T of the solid state thermochromic polymer film is 1 micrometer$\leq$T$\leq$1 millimeter.

20. The solid state thermochromic polymer film of claim 19, wherein the thickness T is 10 micrometers$\leq$T$\leq$500 micrometers.

* * * * *